US012206861B2

(12) United States Patent
Li et al.

(10) Patent No.: US 12,206,861 B2
(45) Date of Patent: Jan. 21, 2025

(54) MOTION VECTOR RESTRICTION FOR OUT-OF-FRAME BOUNDARY CONDITIONS

(71) Applicant: Tencent America LLC, Palo Alto, CA (US)

(72) Inventors: Xiang Li, Saratoga, CA (US); Lien-Fei Chen, Hsinchu (TW); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/965,737

(22) Filed: Oct. 13, 2022

(65) Prior Publication Data

US 2023/0224472 A1 Jul. 13, 2023

Related U.S. Application Data

(60) Provisional application No. 63/298,774, filed on Jan. 12, 2022.

(51) Int. Cl.
*H04N 19/137* (2014.01)
*H04N 19/105* (2014.01)
(Continued)

(52) U.S. Cl.
CPC ......... *H04N 19/137* (2014.11); *H04N 19/105* (2014.11); *H04N 19/159* (2014.11); *H04N 19/176* (2014.11)

(58) Field of Classification Search
CPC .................................................. H04N 19/137
See application file for complete search history.

(56) References Cited

U.S. PATENT DOCUMENTS 9,094,682 B2 * 7/2015 Sugio .................. H04N 19/105
9,883,197 B2 * 1/2018 Chen ..................... H04N 19/11
(Continued)

FOREIGN PATENT DOCUMENTS

CN 103843347 A 6/2014
CN 112655205 A 4/2021
(Continued)

OTHER PUBLICATIONS

High Efficiency Video Coding, Rec. ITU-T H.265 v4 Dec. 2016, pp. 1-664.
(Continued)

*Primary Examiner* — Irfan Habib
(74) *Attorney, Agent, or Firm* — ArentFox Schiff LLP

(57) ABSTRACT

Aspects of the disclosure provide a method and an apparatus for video decoding. The apparatus includes processing circuitry that determines motion information of a current block. The motion information indicates one or more reference blocks of the current block. If a motion information constraint indicates that the one or more reference blocks are within picture boundaries of respective one or more reference pictures, the processing circuitry reconstructs the current block based on the one or more reference blocks. If a first motion vector (MV) points from a region in the current block to a first reference region of a first reference block that is outside a picture boundary of a first reference picture, the processing circuitry determines a first clipped MV pointing from the region to an updated first reference region by clipping the first MV where the updated first reference region is within the picture boundary.

20 Claims, 22 Drawing Sheets

(51) Int. Cl.
*H04N 19/159* (2014.01)
*H04N 19/176* (2014.01)

(56) References Cited

U.S. PATENT DOCUMENTS

| | | | | |
|---|---|---|---|---|
| 10,015,515 | B2* | 7/2018 | Guo | H04N 19/186 |
| 10,021,414 | B2* | 7/2018 | Seregin | H04N 19/52 |
| 10,075,712 | B2* | 9/2018 | Liu | H04N 19/52 |
| 10,547,847 | B2* | 1/2020 | Jang | H04N 19/51 |
| 11,627,324 | B2* | 4/2023 | Xu | H04N 19/44 375/240.12 |
| 11,700,391 | B2* | 7/2023 | Chuang | H04N 19/176 375/240.12 |
| 11,722,667 | B2* | 8/2023 | Zhang | H04N 19/176 375/240.16 |
| 11,936,877 | B2* | 3/2024 | Chen | H04N 19/53 |
| 2012/0207220 | A1 | 8/2012 | Kim | H04N 19/517 375/E7.193 |
| 2013/0163668 | A1* | 6/2013 | Chen | H04N 19/463 375/240.14 |
| 2015/0139325 | A1* | 5/2015 | Chuang | H04N 19/52 375/240.12 |
| 2015/0195527 | A1* | 7/2015 | Zhou | H04N 19/523 375/240.02 |
| 2016/0337661 | A1* | 11/2016 | Pang | H04N 19/593 |
| 2017/0289566 | A1* | 10/2017 | He | H04N 19/147 |
| 2017/0295370 | A1* | 10/2017 | Xu | H04N 19/523 |
| 2017/0339426 | A1* | 11/2017 | Lee | H04N 19/52 |
| 2018/0098063 | A1* | 4/2018 | Chen | H04N 19/139 |
| 2018/0124411 | A1* | 5/2018 | Nakagami | H04N 19/513 |
| 2019/0149837 | A1* | 5/2019 | Lim | H04N 19/513 375/240.16 |
| 2020/0077115 | A1 | 3/2020 | Li et al. | |
| 2020/0137398 | A1 | 4/2020 | Zhao et al. | |
| 2020/0154126 | A1 | 5/2020 | Li et al. | |
| 2021/0176485 | A1* | 6/2021 | Chuang | H04N 19/159 |
| 2021/0385464 | A1* | 12/2021 | Xu | H04N 19/176 |
| 2022/0248028 | A1* | 8/2022 | Park | H04N 19/55 |
| 2023/0019544 | A1* | 1/2023 | Solovyev | H04N 19/52 |
| 2023/0362403 | A1* | 11/2023 | Lo | H04N 19/176 |
| 2024/0275941 | A1* | 8/2024 | Zhang | H04N 19/11 |

FOREIGN PATENT DOCUMENTS

| | | |
|---|---|---|
| JP | 2014-531873 A | 11/2014 |
| JP | 2021-529462 A | 10/2021 |
| WO | WO-2019199045 A1 * | 10/2019 |

OTHER PUBLICATIONS

ITU-T and ISO/IEC, "Versatile Video Coding", ITU-T Rec. H.266 and ISO/IEC 23090-3, 2020, pp. 1-516.

V. Seregin, et al., "Exploration Experiment on Enhanced Compression beyond VVC capability", ISO/IEC JTC1/SC29/WG11 JVET-U2024, Jan. 2021, pp. 1-19.

Y.-J. Chang, et al., "Compression efficiency methods beyond VVC", ISO/IEC JTC1/SC29/WG11 JVET-U0100, Jan. 2021, pp. 1-13.

International Search Report and Written Opinion issued in International Application No. PCT/US2022/078219, mailed Jan. 6, 2023, 20 pages.

Y.-W. Chen, et al., "Description of SDR, HDR and 360° video coding technology proposal by Qualcomm and Technicolor—low and high complexity versions", ISO/IEC JTC1/SC29/WG11 JVET-J0021, Apr. 2018, pp. 1-43.

C.-C. Chen, V. Seregin, Y.-J. Chang, Z. Zhang, H. Huang, Y. Zhang, and M. Karczewicz, "EE2-related: Extension of template matching to Affine, CIIP, GPM merge modes, and boundary sub-blocks", ISO/IEC JTC1/SC29/WG11 JVET-V0118, Apr. 2021, pp. 1-3.

Office Action received for Chinese Patent Application No. 202280009683.X, mailed on May 30, 2024, 20 pages (10 pages of English Translation and 10 pages of Original Document).

Office Action received for Japanese Patent Application No. 2023-558746, mailed on Oct. 22, 2024, 14 pages (8 pages of English Translation and 6 pages of Original Document).

* cited by examiner

| amvr_flag | amvr_precision_idx | inter_affine_flag[ x0 ][ y0 ] == 1 | AmvrShift CuPredMode[ chType ][ x0 ][ y0 ] == MODE_IBC ) | inter_affine_flag[ x0 ][ y0 ] == 0 && CuPredMode[ chType ][ x0 ][ y0 ] != MODE_IBC |
|---|---|---|---|---|
| 0 | - | 2 (1/4 luma sample) | - | 2 (1/4 luma sample) |
| 1 | 0 | 0 (1/16 luma sample) | 4 (1 luma sample) | 3 (1/2 luma sample) |
| 1 | 1 | 4 (1 luma sample) | 6 (4 luma samples) | 4 (1 luma sample) |
| 1 | 2 | - | - | 6 (4 luma samples) |

*FIG. 13*

If inter_affine_flag[ x0 ][ y0 ] is equal to 0, the variables MvdL0[ x0 ][ y0 ][ 0 ], MvdL0[ x0 ][ y0 ][ 1 ], MvdL1[ x0 ][ y0 ][ 0 ], MvdL1[ x0 ][ y0 ][ 1 ] are modified as follows:

MvdL0[ x0 ][ y0 ][ 0 ] = MvdL0[ x0 ][ y0 ][ 0 ] << AmvrShift

MvdL0[ x0 ][ y0 ][ 1 ] = MvdL0[ x0 ][ y0 ][ 1 ] << AmvrShift

MvdL1[ x0 ][ y0 ][ 0 ] = MvdL1[ x0 ][ y0 ][ 0 ] << AmvrShift

MvdL1[ x0 ][ y0 ][ 1 ] = MvdL1[ x0 ][ y0 ][ 1 ] << AmvrShift

Otherwise (inter_affine_flag[ x0 ][ y0 ] is equal to 1), the variables MvdCpL0[ x0 ][ y0 ][ 0 ][ 0 ], MvdCpL0[ x0 ][ y0 ][ 0 ][ 1 ], MvdCpL0[ x0 ][ y0 ][ 1 ][ 0 ], MvdCpL0[ x0 ][ y0 ][ 1 ][ 1 ], MvdCpL0[ x0 ][ y0 ][ 2 ][ 0 ] and MvdCpL0[ x0 ][ y0 ][ 2 ][ 1 ] are modified as follows:

MvdCpL0[ x0 ][ y0 ][ 0 ][ 0 ] = MvdCpL0[ x0 ][ y0 ][ 0 ][ 0 ] << AmvrShift

MvdCpL0[ x0 ][ y0 ][ 0 ][ 1 ] = MvdCpL0[ x0 ][ y0 ][ 0 ][ 1 ] << AmvrShift

MvdCpL0[ x0 ][ y0 ][ 1 ][ 0 ] = MvdCpL0[ x0 ][ y0 ][ 1 ][ 0 ] << AmvrShift

MvdCpL0[ x0 ][ y0 ][ 1 ][ 1 ] = MvdCpL0[ x0 ][ y0 ][ 1 ][ 1 ] << AmvrShift

MvdCpL0[ x0 ][ y0 ][ 2 ][ 0 ] = MvdCpL0[ x0 ][ y0 ][ 2 ][ 0 ] << AmvrShift

MvdCpL0[ x0 ][ y0 ][ 2 ][ 1 ] = MvdCpL0[ x0 ][ y0 ][ 2 ][ 1 ] << AmvrShift

*FIG. 14A*

If inter_affine_flag[ x0 ][ y0 ] is equal to 0, the variables MvdL0[ x0 ][ y0 ][ 0 ], MvdL0[ x0 ][ y0 ][ 1 ], MvdL1[ x0 ][ y0 ][ 0 ], MvdL1[ x0 ][ y0 ][ 1 ] are modified as follows:

MvdL0[ x0 ][ y0 ][ 0 ] = MvdL0[ x0 ][ y0 ][ 0 ] << AmvrShift

MvdL0[ x0 ][ y0 ][ 1 ] = MvdL0[ x0 ][ y0 ][ 1 ] << AmvrShift

MvdL1[ x0 ][ y0 ][ 0 ] = MvdL1[ x0 ][ y0 ][ 0 ] << AmvrShift

MvdL1[ x0 ][ y0 ][ 1 ] = MvdL1[ x0 ][ y0 ][ 1 ] << AmvrShift

}

Otherwise (inter_affine_flag[ x0 ][ y0 ] is equal to 1), the variables MvdCpL0[ x0 ][ y0 ][ 0 ][ 0 ], MvdCpL0[ x0 ][ y0 ][ 0 ][ 1 ], MvdCpL0[ x0 ][ y0 ][ 1 ][ 0 ], MvdCpL0[ x0 ][ y0 ][ 1 ][ 1 ], MvdCpL0[ x0 ][ y0 ][ 2 ][ 0 ] and MvdCpL0[ x0 ][ y0 ][ 2 ][ 1 ] are modified as follows:

MvdCpL0[ x0 ][ y0 ][ 0 ][ 0 ] = MvdCpL0[ x0 ][ y0 ][ 0 ][ 0 ] << AmvrShift

MvdCpL1[ x0 ][ y0 ][ 0 ][ 1 ] = MvdCpL1[ x0 ][ y0 ][ 0 ][ 1 ] << AmvrShift

MvdCpL0[ x0 ][ y0 ][ 1 ][ 0 ] = MvdCpL0[ x0 ][ y0 ][ 1 ][ 0 ] << AmvrShift

MvdCpL1[ x0 ][ y0 ][ 1 ][ 1 ] = MvdCpL1[ x0 ][ y0 ][ 1 ][ 1 ] << AmvrShift

MvdCpL0[ x0 ][ y0 ][ 2 ][ 0 ] = MvdCpL0[ x0 ][ y0 ][ 2 ][ 0 ] << AmvrShift

MvdCpL1[ x0 ][ y0 ][ 2 ][ 1 ] = MvdCpL1[ x0 ][ y0 ][ 2 ][ 1 ] << AmvrShift

MOTION VECTOR RESTRICTION FOR OUT-OF-FRAME BOUNDARY CONDITIONS

INCORPORATION BY REFERENCE

The present application claims the benefit of priority to U.S. Provisional Application No. 63/298,774, "MV RESTRICTION OF BI-PREDICTION FOR OUT-OF-FRAME BOUNDARY CONDITIONS" filed on Jan. 12, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding and decoding. In some examples, an apparatus for video decoding includes processing circuitry. The processing circuitry is configured to determine motion information of a current block predicted with inter prediction. The motion information indicates one or more reference blocks of the current block associated with respective one or more reference pictures. If a motion information constraint indicates that the one or more reference blocks are within picture boundaries of the respective one or more reference pictures, the processing circuitry can reconstruct the current block based on the one or more reference blocks. A first motion vector (MV) indicated by the motion information can point from a region in the current block to a first reference region that is a region of a first reference block in the one or more reference blocks. If the first reference region is outside a picture boundary of a first reference picture of the one or more reference pictures where the picture boundaries include the picture boundary of the first reference picture, the processing circuitry can determine a first clipped MV pointing from the region in the current block to an updated first reference region by clipping the first MV such that the updated first reference region is in an updated first reference block that is within the picture boundary of the first reference picture. The processing circuitry can reconstruct the region in the current block based on the updated first reference region.

In an embodiment, the current block is bi-predicted with an adaptive motion vector prediction (AMVP) mode. The motion information indicates the first MV pointing from the current block to the first reference block and a second MV pointing from the current block to a second reference block associated with a second reference picture. The one or more reference blocks consist of the first reference block and the second reference block. The motion information constraint indicates that the first reference block is within the picture boundary of the first reference picture and the second reference block is within a picture boundary of the second reference picture where the picture boundaries include the picture boundary of the second reference picture.

In an embodiment, the motion information indicates an MV predictor (MVP) candidate in a candidate list, and the MVP candidate indicates a first MVP and a second MVP. The first MVP points to a first intermediate reference block that corresponds to the current block and that is within the picture boundary of the first reference picture. The second MVP points to a second intermediate reference block that corresponds to the current block and that is within the picture boundary of the second reference picture. The processing circuitry can determine the first MV based on the first MVP and a first MV difference (MVD), and determine a second MV based on the second MVP and a second MVD. The second MV points to the second reference block.

In an embodiment, the current block is bi-predicted with an affine mode and includes plural subblocks. The motion information indicates MV pairs each associated with one of the plural subblocks. Each MV pair associated with the respective subblock in the plural subblocks includes a first MV pointing from the respective subblock to a first reference subblock in the first reference block and a second MV pointing from the respective subblock to a second reference subblock in a second reference block associated with a second reference picture. The one or more reference blocks consist of first reference block and the second reference block. The motion information constraint indicates that each of the first reference subblocks is within the picture boundary of the first reference picture and each of the second reference subblocks is within a picture boundary of the second reference picture where the picture boundaries include the picture boundary of the second reference picture.

In an embodiment, the current block is bi-predicted with a merge mode, and a candidate list of the current block includes one or more MV predictor (MVP) candidates. The processing circuitry can determine an MVP candidate of the current block from the one or more MVP candidates based on an MVP index. The MVP candidate indicates a first MVP associated with the first reference picture and a second MVP associated with a second reference picture. The processing circuitry can determine the first MV of the current block to be the first MVP and a second MV of the current block to be the second MVP. The motion information constraint indicates that (i) the first reference block pointed to by the first MV is within the picture boundary of the first reference picture and (ii) a second reference block pointed to by the second MV is within a picture boundary of the second reference picture. The picture boundaries include the picture boundary of the second reference picture.

In an embodiment, for each MVP candidate in the one or more MVP candidates that indicates a respective first MVP and a respective second MVP, the motion information constraint indicates that (i) a first intermediate reference block pointed to by the respective first MVP is within a picture boundary of a respective first reference picture, and (ii) a second intermediate reference block pointed to by the respective second MVP is within a picture boundary of a respective second reference picture.

In an embodiment, the current block is bi-predicted with an affine merge mode and includes plural subblocks, and a candidate list of the current block includes one or more affine merge candidates. For each subblock in the plural subblocks, the processing circuitry can determine, for each region in the respective subblock, an MV pair of the respective region based on an affine merge candidate in the one or more affine merge candidates. The MV pair includes a respective first MV pointing from the region to a first region in a first reference subblock in the first reference block and a respective second MV pointing from the region to a second region in a second reference subblock that is in a second reference block associated with a second reference picture. The first reference block and the second reference block correspond to the current block, the first reference subblock and the second reference subblock correspond to the respective subblock. For each subblock in the plural subblocks, the motion information constraint indicates that each first region is within the picture boundary of the first reference picture and each second region is within a picture boundary of the second reference picture, the picture boundaries including the picture boundary of the second reference picture.

In an embodiment, the current block is bi-predicted. The motion information indicates the first MV pointing from the current block to the first reference block and a second MV pointing from the current block to a second reference block associated with a second reference picture. The one or more reference blocks consist of the first reference block and the second reference block. The first reference region of the first reference block is outside the picture boundary of the first reference picture. The processing circuitry can determine the first clipped MV by clipping the first MV such that the updated first reference block is within the picture boundary of the first reference picture. If the second reference block is outside a picture boundary of the second reference picture, the processing circuitry can determine a second clipped MV by clipping the second MV such that an updated second reference block is within the picture boundary of the second reference picture. The second clipped MV points from the current block to the updated second reference block, and the picture boundaries include the picture boundary of the second reference picture.

In an embodiment, the current block is bi-predicted with an affine mode and includes plural subblocks. For each subblock in the plural subblocks, the processing circuitry can determine, for each region in the respective subblock, an MV pair of the respective region using the affine mode. The MV pair includes a respective first MV pointing from the region to the first reference region in a first reference subblock in the first reference block and a second MV pointing from the region to a second reference region in a second reference subblock that is in a second reference block associated with a second reference picture. The first reference block and the second reference block correspond to the current block, and the first reference subblock and the second reference subblock correspond to the respective subblock. The first reference region is in the first reference subblock in the first reference block, and the region in the current block is in a subblock of the plural subblocks corresponding to the first reference subblock. The first reference region is outside the picture boundary of the first reference picture. The processing circuitry can determine the first clipped MV by clipping the first MV where the first clipped MV points from the region in the subblock to the updated first reference region.

Aspects of the disclosure also provide a non-transitory computer-readable storage medium storing a program executable by at least one processor to perform the methods for video decoding.

BRIEF DESCRIPTION OF THE DRAWINGS

Further features, the nature, and various advantages of the disclosed subject matter will be more apparent from the following detailed description and the accompanying drawings in which:

FIG. 13 shows an example of an adaptive motion vector resolution (AMVR) shift value corresponding to a motion vector resolution (MVR).

FIGS. 14A-14B show exemplary modifications of motion vector differences in an adaptive motion vector prediction (AMVP) mode and in an affine AMVP mode when an AMVR mode is enabled.

DETAILED DESCRIPTION OF EMBODIMENTS

Figure 1A:
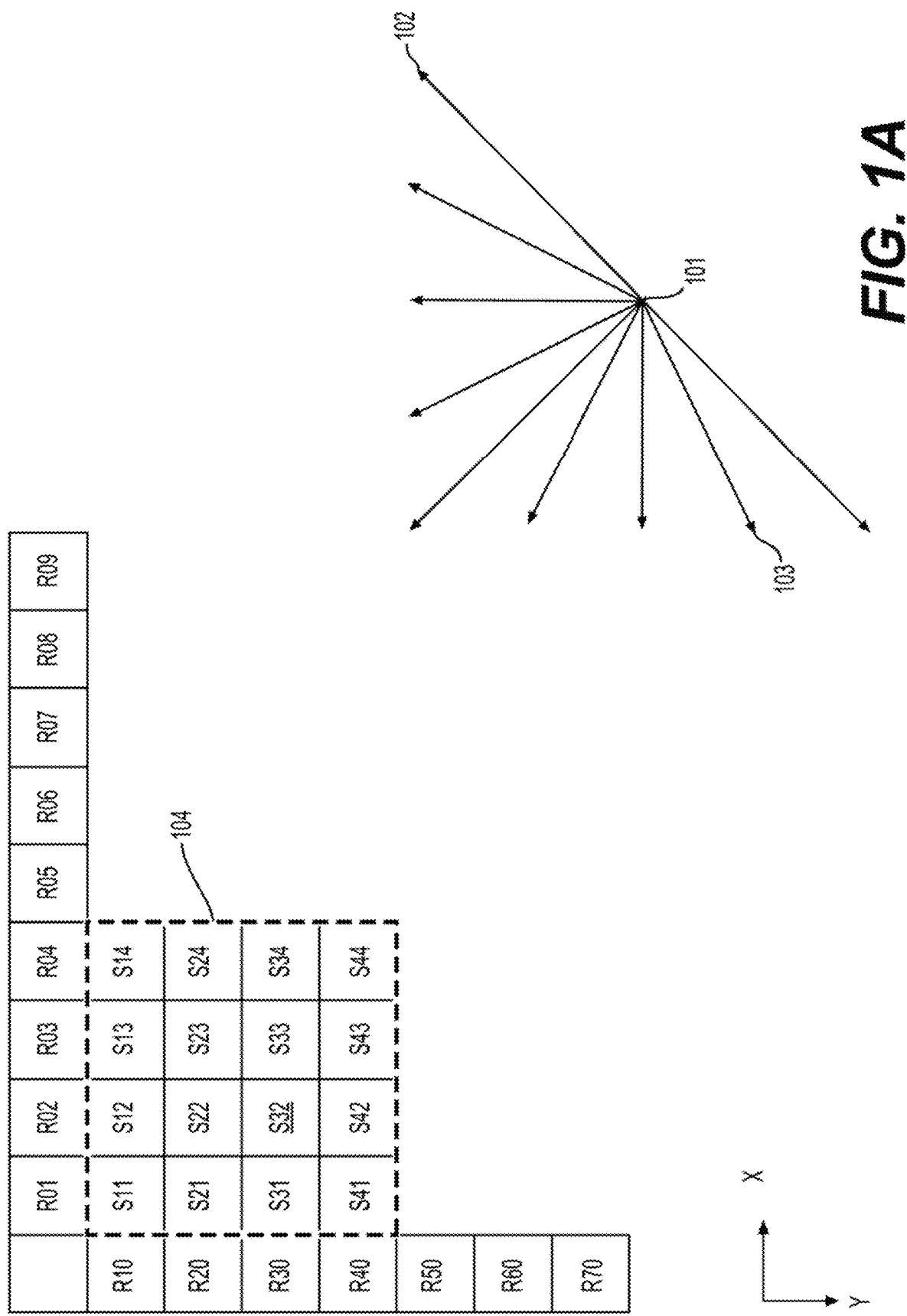
FIG. 1A is a schematic illustration of an exemplary subset of intra prediction modes.
Figure 1B:
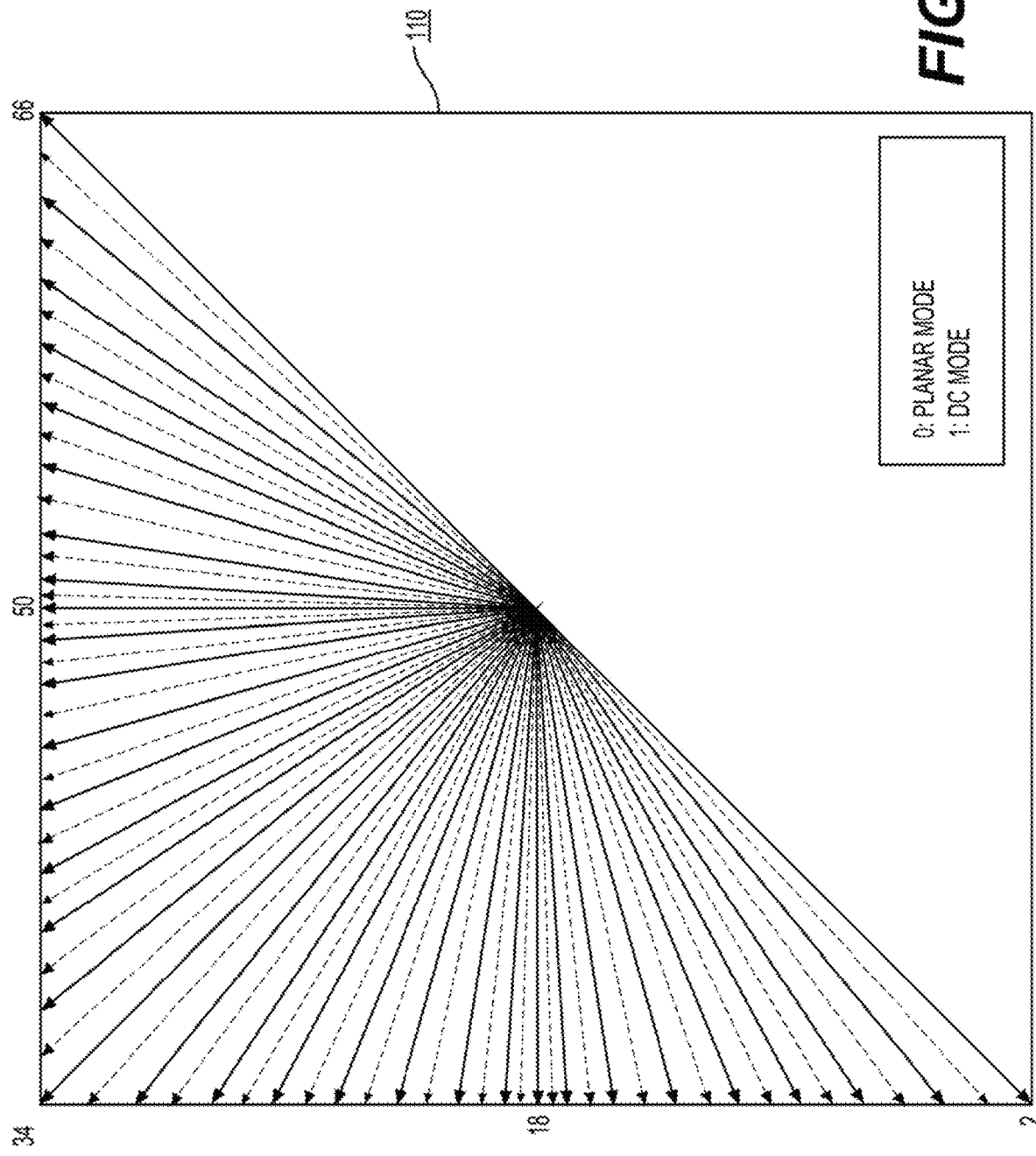
FIG. 1B is an illustration of exemplary intra prediction directions.
Figure 2:
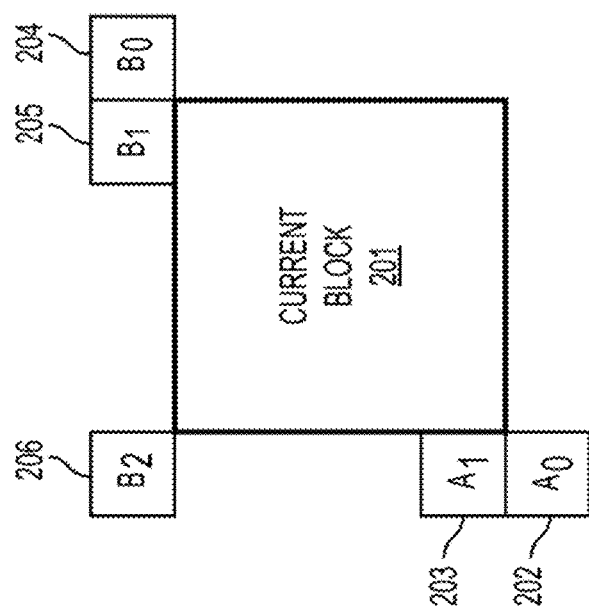
FIG. 2 shows an example of a current block (201) and surrounding samples.
Figure 3:
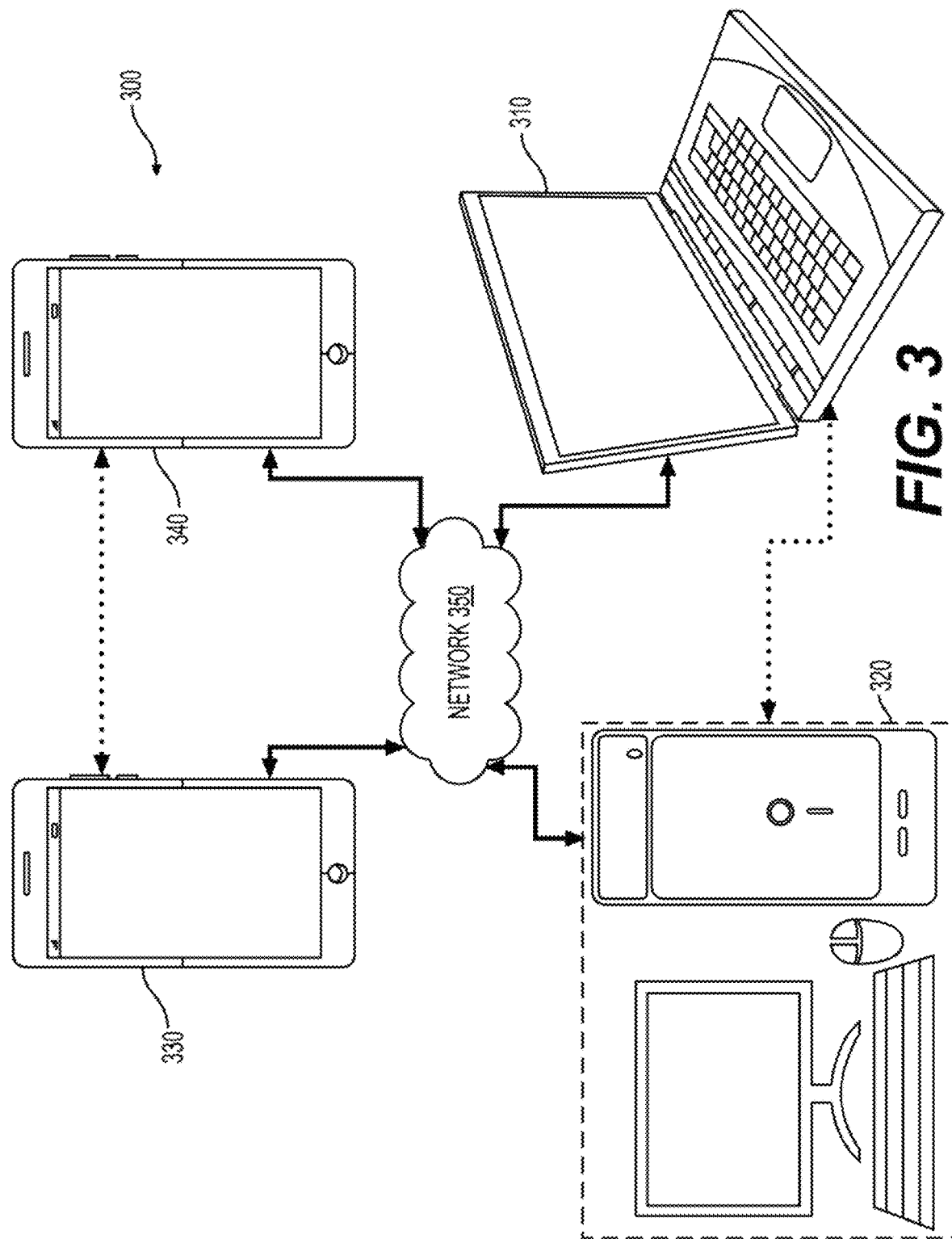
FIG. 3 is a schematic illustration of an exemplary block diagram of a communication system (300).

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
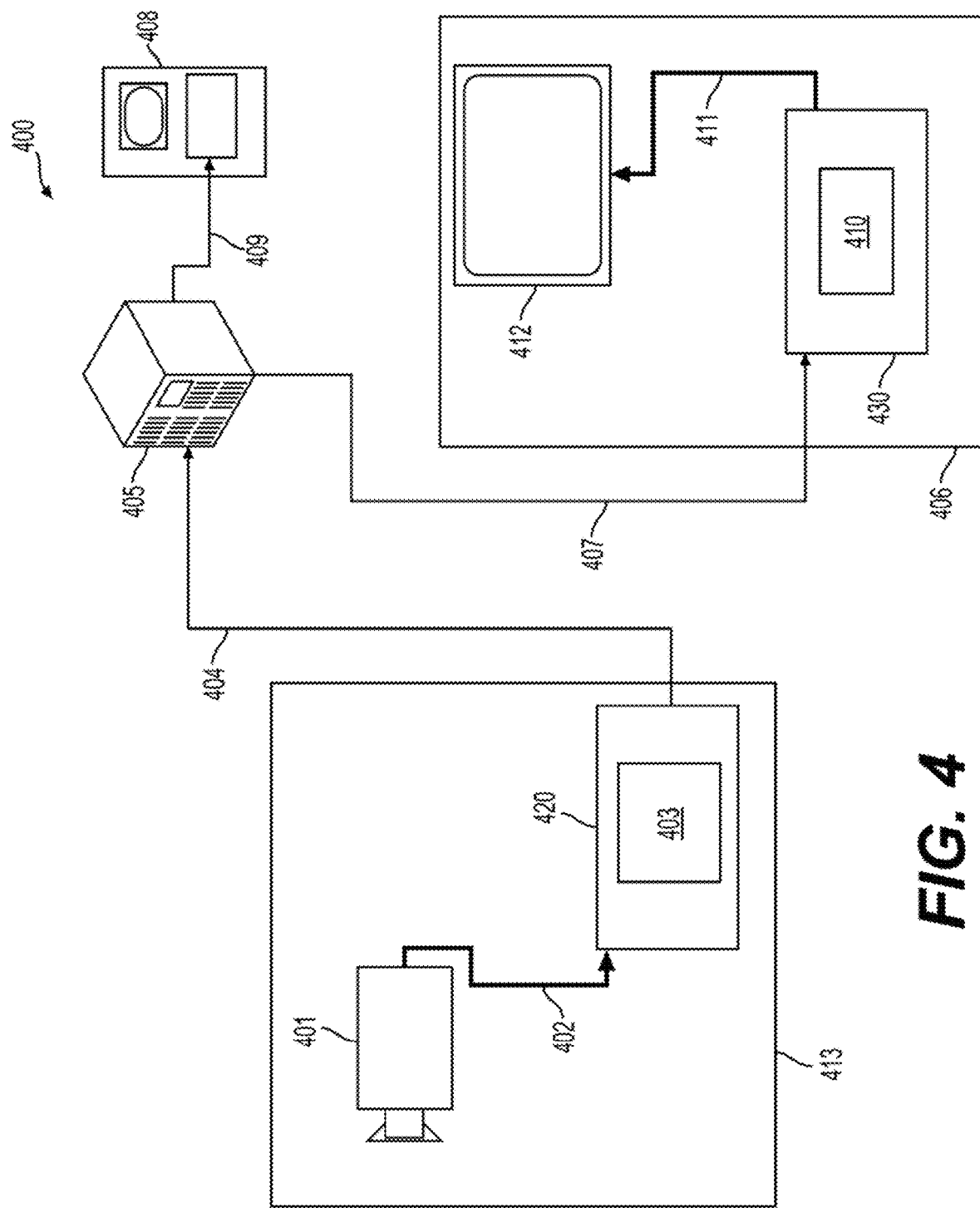
FIG. 4 is a schematic illustration of an exemplary block diagram of a communication system (400).

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
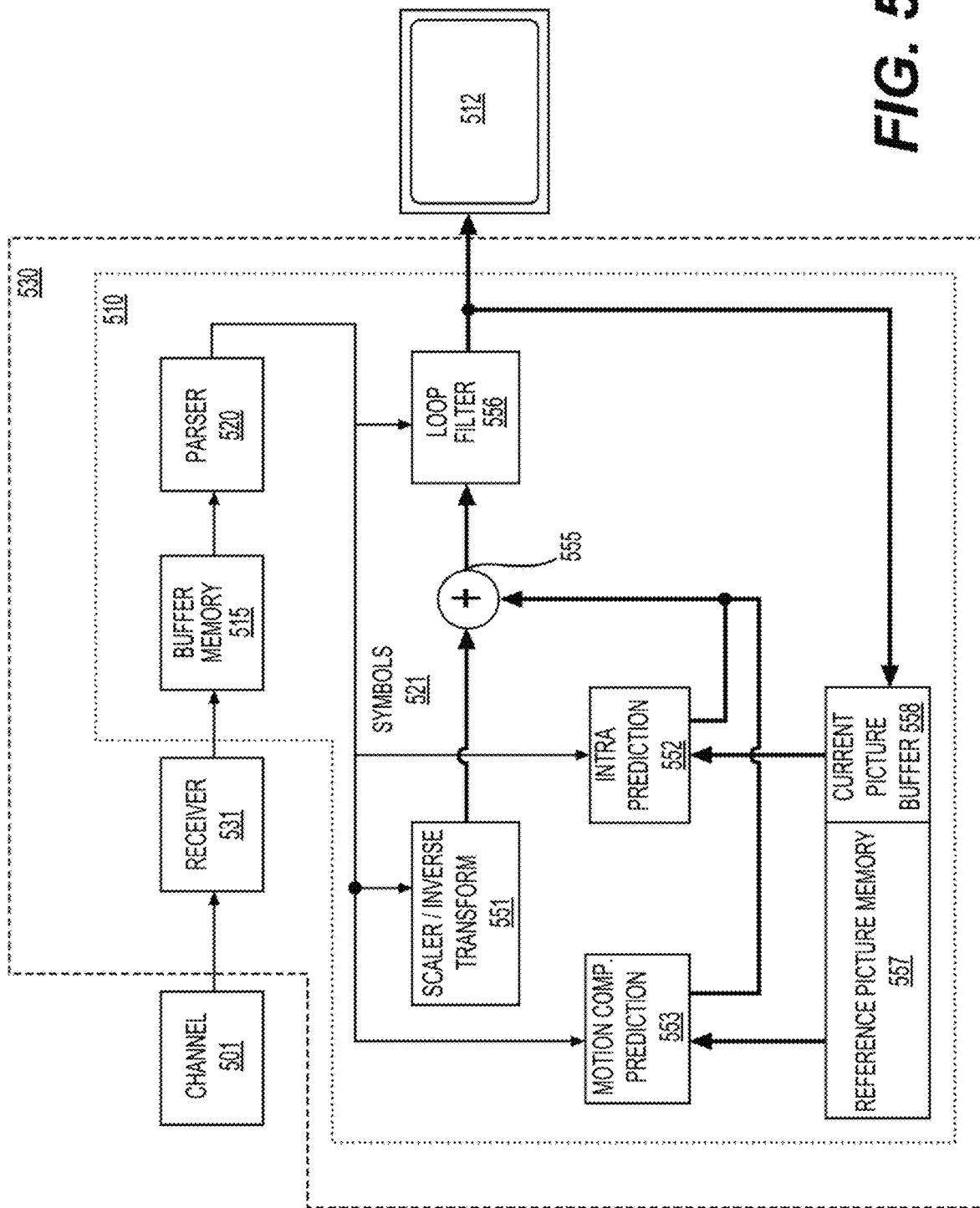
FIG. 5 is a schematic illustration of an exemplary block diagram of a decoder.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
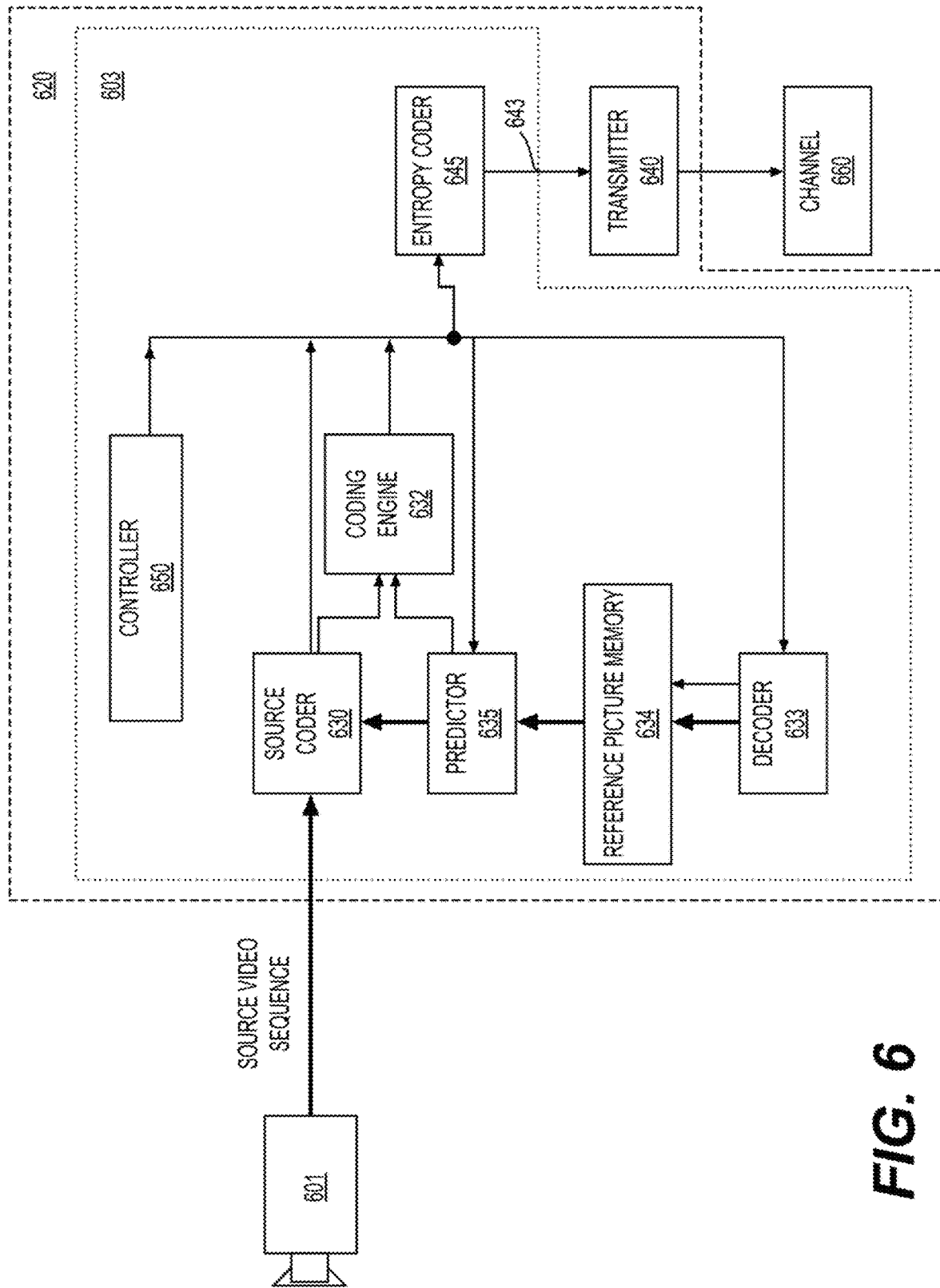
FIG. 6 is a schematic illustration of an exemplary block diagram of an encoder.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
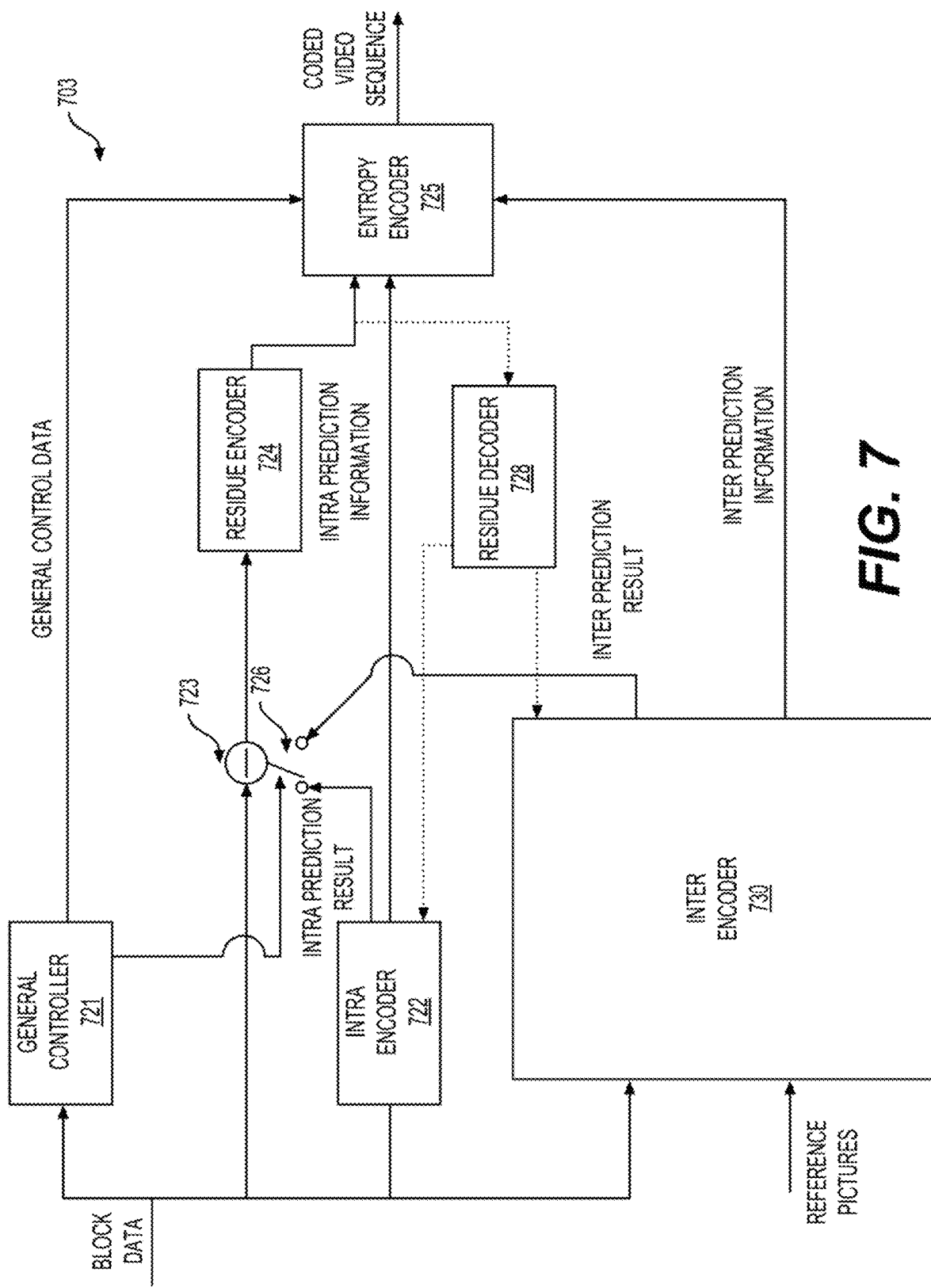
FIG. 7 shows a block diagram of an exemplary encoder.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
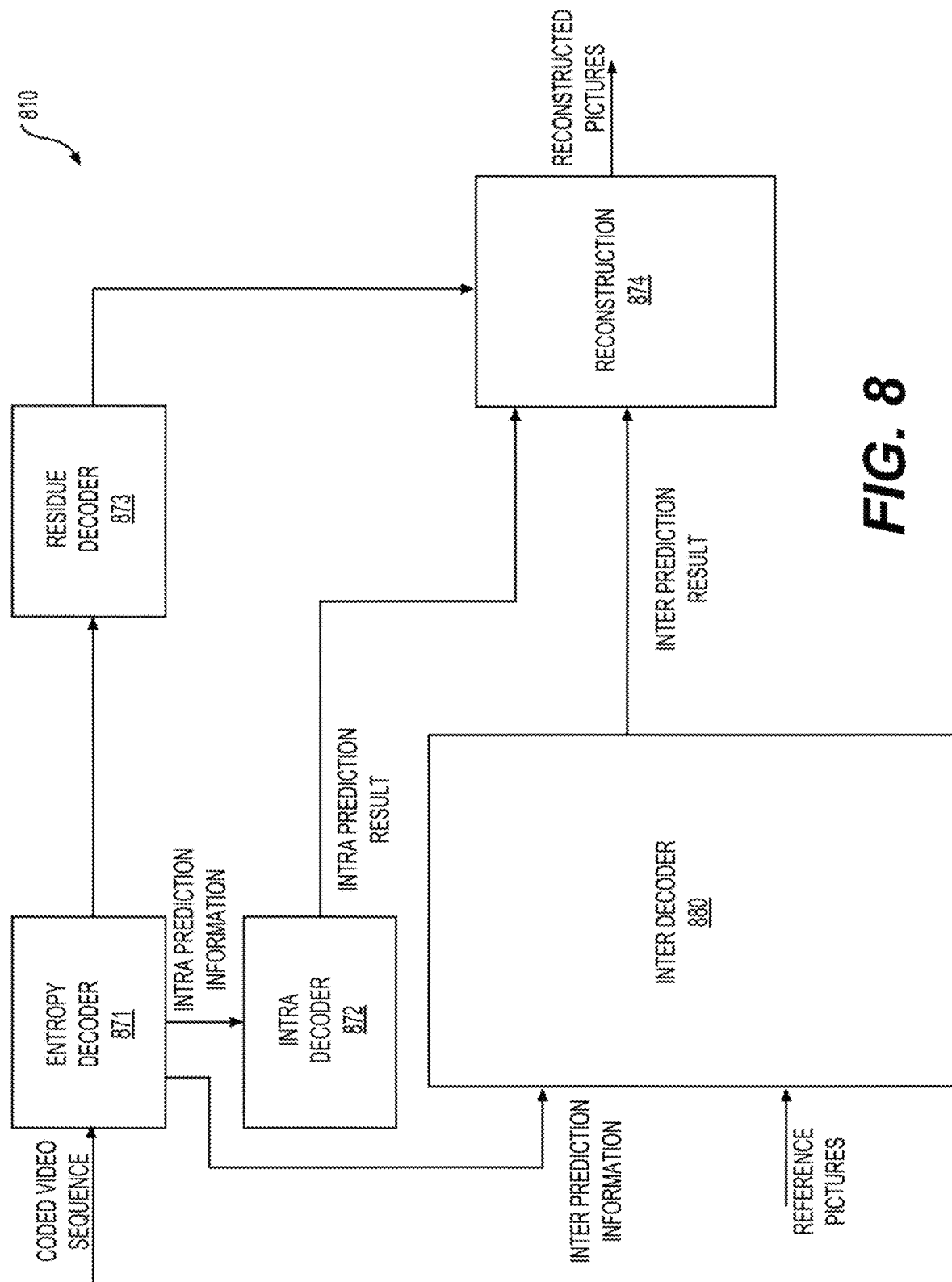
FIG. 8 shows a block diagram of an exemplary decoder.

FIG. 8 shows an exemplary diagram of a video decoder (810). The video decoder (810) is configured to receive coded pictures that are part of a coded video sequence, and decode the coded pictures to generate reconstructed pictures.

In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Various inter prediction modes can be used in VVC. For an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like. Inter predictions and related methods are described in details below.

Extended merge prediction can be used in some examples. In an example, such as in VTM4, a merge candidate list is constructed by including the following five types of candidates in order: spatial motion vector predictor(s) (MVP(s)) from spatial neighboring CU(s), temporal MVP(s) from collocated CU(s), history-based MVP(s) from a first-in-first-out (FIFO) table, pairwise average MVP(s), and zero MV(s).

A size of the merge candidate list can be signaled in a slice header. In an example, the maximum allowed size of the merge candidate list is 6 in VTM4. For each CU coded in the merge mode, an index (e.g., a merge index) of a best merge candidate can be encoded using truncated unary binarization (TU). The first bin of the merge index can be coded with context (e.g., context-adaptive binary arithmetic coding (CABAC)) and a bypass coding can be used for other bins.

Figure 9:
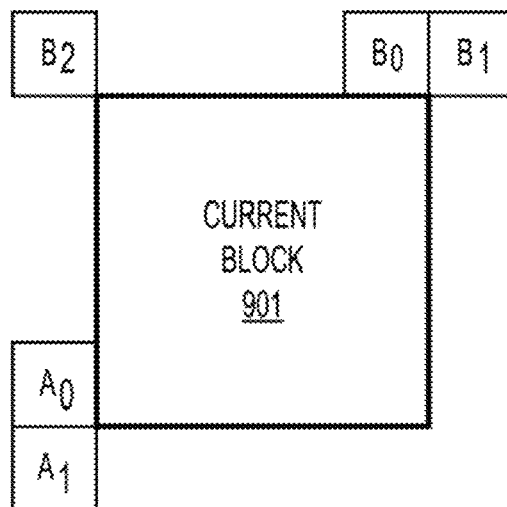
FIG. 9 shows positions of spatial merge candidates according to an embodiment of the disclosure.

Some examples of a generation process of each category of merge candidates are provided below. In an embodiment, spatial candidate(s) are derived as follows. The derivation of spatial merge candidates in VVC can be identical to that in HEVC. In an example, a maximum of four merge candidates are selected among candidates located in positions depicted in FIG. 9. FIG. 9 shows positions of spatial merge candidates according to an embodiment of the disclosure. Referring to FIG. 9, an order of derivation is B1, A1, B0, A0, and B2. The position B2 is considered only when any CU of positions A0, B0, B1, and A1 is not available (e.g. because the CU belongs to another slice or another tile) or is intra coded. After a candidate at the position A1 is added, the addition of the remaining candidates is subject to a redundancy check which ensures that candidates with same motion information are excluded from the candidate list so that coding efficiency is improved.

Figure 10:
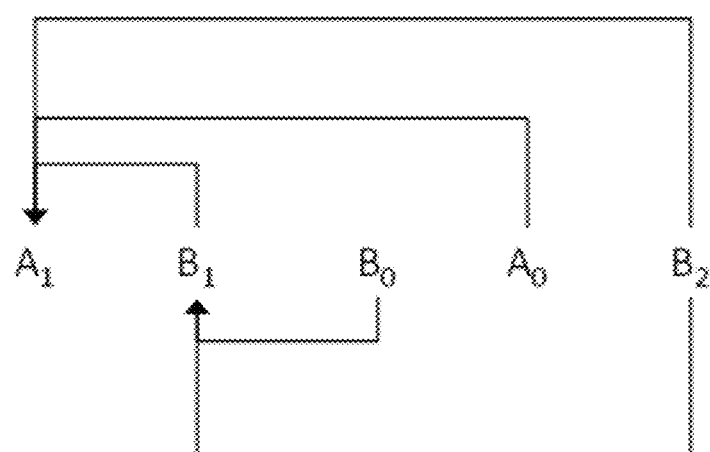
FIG. 10 shows candidate pairs that are considered for a redundancy check of spatial merge candidates according to an embodiment of the disclosure.

To reduce computational complexity, not all possible candidate pairs are considered in the mentioned redundancy check. Instead, only pairs linked with an arrow in FIG. 10 are considered and a candidate is only added to the candidate list if the corresponding candidate used for the redundancy check does not have the same motion information. FIG. 10 shows candidate pairs that are considered for a redundancy check of spatial merge candidates according to an embodiment of the disclosure. Referring to FIG. 10, the pairs linked with respective arrows include A1 and B1, A1 and A0, A1 and B2, B1 and B0, and B1 and B2. Thus, candidates at the positions B1, A0, and/or B2 can be compared with the candidate at the position A1, and candidates at the positions B0 and/or B2 can be compared with the candidate at the position B1.

Figure 11:
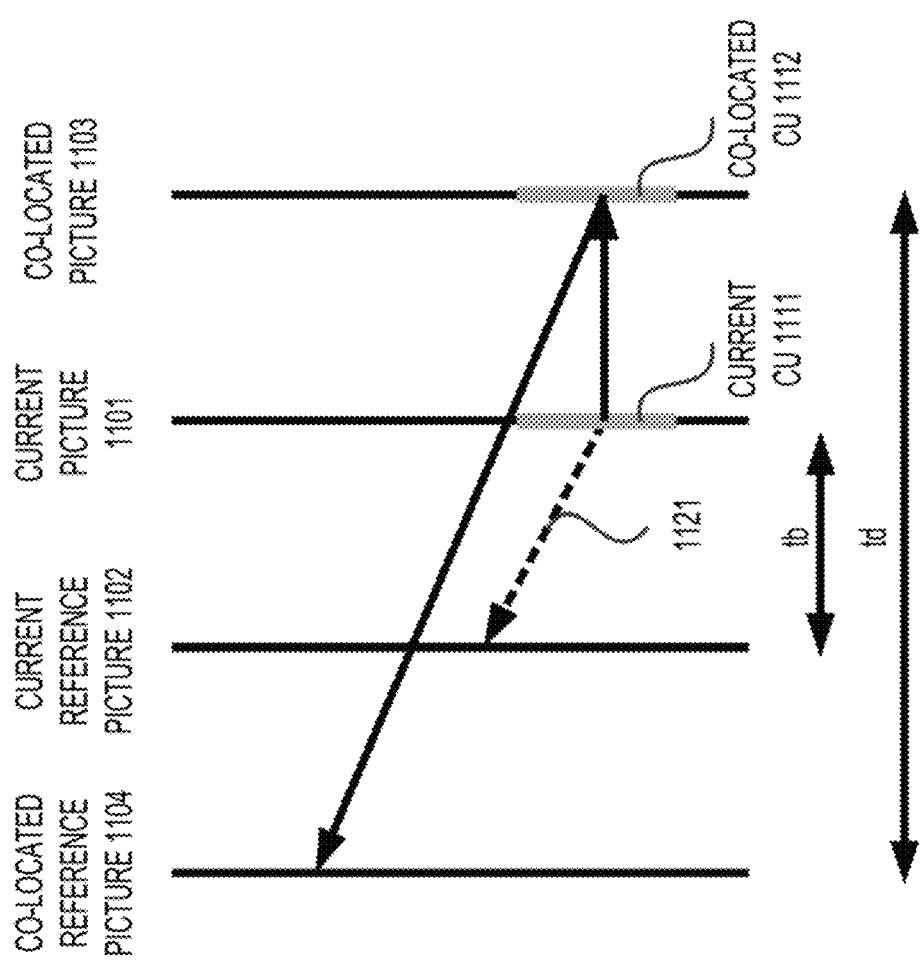
FIG. 11 shows exemplary motion vector scaling for a temporal merge candidate.

In an embodiment, temporal candidate(s) are derived as follows. In an example, only one temporal merge candidate is added to the candidate list. FIG. 11 shows exemplary motion vector scaling for a temporal merge candidate. To derive the temporal merge candidate of a current CU (1111) in a current picture (1101), a scaled MV (1121) (e.g., shown by a dotted line in FIG. 11) can be derived based on a co-located CU (1112) belonging to a co-located reference picture (1104). A reference picture list used to derive the co-located CU (1112) can be explicitly signaled in a slice header. The scaled MV (1121) for the temporal merge candidate can be obtained as shown by the dotted line in FIG. 11. The scaled MV (1121) can be scaled from the MV of the co-located CU (1112) using picture order count (POC) distances tb and td. The POC distance tb can be defined to be the POC difference between a current reference picture (1102) of the current picture (1101) and the current picture (1101). The POC distance td can be defined to be the POC difference between the co-located reference picture (1104) of the co-located picture (1103) and the co-located picture (1103). A reference picture index of the temporal merge candidate can be set to zero.

Figure 12:
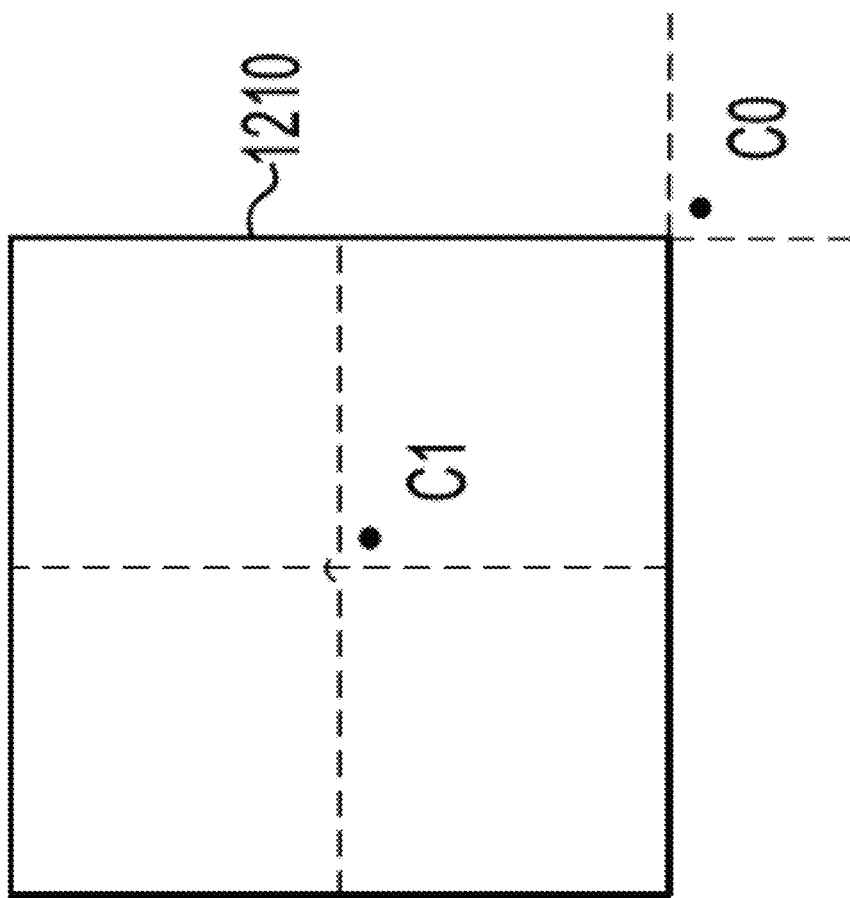
FIG. 12 shows exemplary candidate positions for a temporal merge candidate of a current coding unit.

FIG. 12 shows exemplary candidate positions (e.g., C0 and C1) for a temporal merge candidate of a current CU. A position for the temporal merge candidate can be selected between the candidate positions C0 and C1. The candidate position C0 is located at a bottom-right corner of a co-located CU (1210) of the current CU. The candidate position C1 is located at a center of the co-located CU (1210) of the current CU. If a CU at the candidate position C0 is not available, is intra coded, or is outside of a current row of CTUs, the candidate position C1 is used to derive the temporal merge candidate. Otherwise, for example, the CU at the candidate position C0 is available, intra coded, and in the current row of CTUs, the candidate position C0 is used to derive the temporal merge candidate.

An adaptive motion vector resolution (AMVR) mode can be used in video/image coding, such as in VVC. In some technologies, such as the video coding standards HEVC and AVC/H.264, a fixed motion vector resolution (MVR) of a quarter (¼) luma samples (or ¼-pel) is used. In general, an optimum trade-off between a displacement vector rate and a prediction error rate is chosen to optimize the rate-distortion. In related technologies, such as VVC, the AMVR mode is enabled where an MVR can be selected, for example, at a coding block level from a plurality of MVRs, and thus to trade off a bit rate for fidelity of signaling motion parameters. The AMVR mode can be signaled at the coding block level, for example, if at least one component of an MVD is not equal to zero. A motion vector predictor (MVP) can be rounded to the given MVR such that a resulting MV (e.g., a sum of the MVP and the MVD) can fall on a grid of the given MVR.

FIG. 13 shows an example of an Amvr shift value (e.g., AmvrShift) corresponding to a resolution (e.g., an MVR). For each given resolution (e.g., the MVR), the corresponding Amvr shift value (e.g., AmvrShift) indicates a shifting operation (e.g., a left shifting operation). For example, the AmvrShift is defined to specify the MVR of the MVD with a left shifting operation, and a number of bits that is shifted is indicated by the AmvrShift.

In some examples, a flag, such as an AMVR flag (e.g., amvr_flag) specifies a resolution (e.g., an MVR) of an MVD. In an example, the AMVR flag (e.g., the amvr_flag) being equal to 0 specifies that the MVR of the MVD is ¼ luma samples (¼-pel). Referring to FIG. 13, an MVR of ¼-pel corresponds to the left shifting operation of 2 bits (e.g., AmvrShift being 2 bits).

The AMVR flag (e.g., amvr_flag) being equal to 1 specifies that the MVR of the MVD is further specified by addition information such as an index (e.g., an AMVR precision index or denoted as amvr_precision_idx in FIG. 13) and/or the prediction mode. Referring to FIG. 13, the prediction mode can be an affine prediction mode or an affine mode indicated by the inter affine flag, an IBC mode indicated by a parameter mode IBC, or an inter prediction mode that is neither the affine prediction mode nor the IBC mode. For example, the inter prediction mode is whole block-based inter prediction.

For example, the coding block is predicted with the AMVP mode and the AMVR flag (e.g., amvr_flag) is 1, and thus the MVR is ½ luma samples (½-Pel), 1 Luma sample (1-pel), or 4 luma samples (4-pel) when the AMVR precision index is 0, 1, or 2, respectively when the inter prediction mode (e.g., the whole block-based inter prediction) is neither the affine prediction mode nor the IBC mode. In an example, ½-pel, 1-pel, or 4-pel corresponds to an AmvrShift of 3, 4, or 6 bits.

The given MVDs, denoted as MvdL0 and MvdL1 in the AMVP mode or denoted as MvdCpL0, and MvdCpL1 in the affine AMVP mode, can be modified as shown in FIG. 14A or FIG. 14B when the AMVR mode is enabled.

Figure 15B:
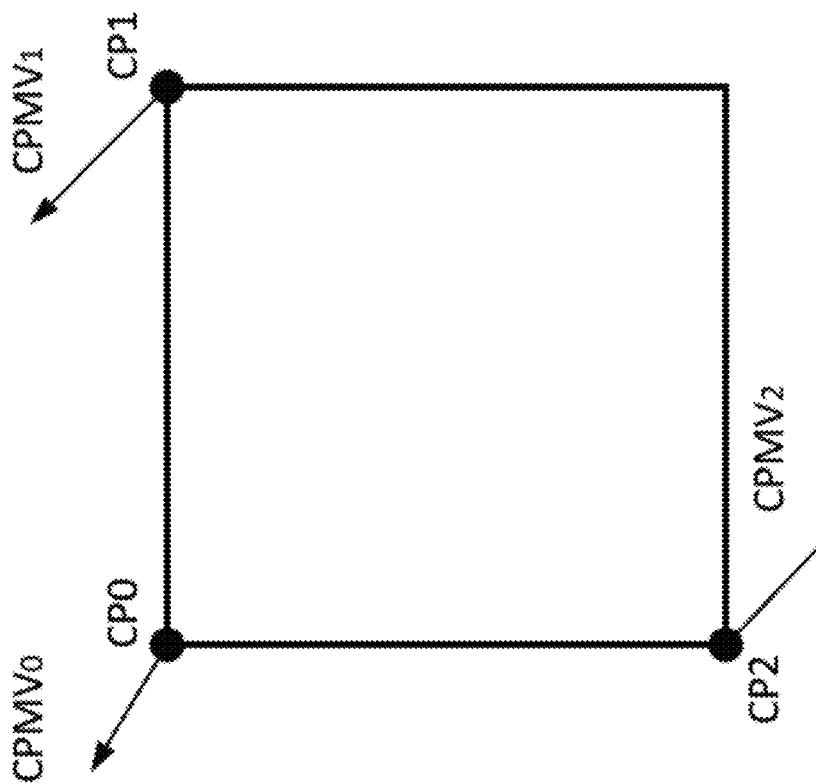
FIG. 15B shows an affine motion field of a block when a 6-parameter affine model is used.
Figure 15A:
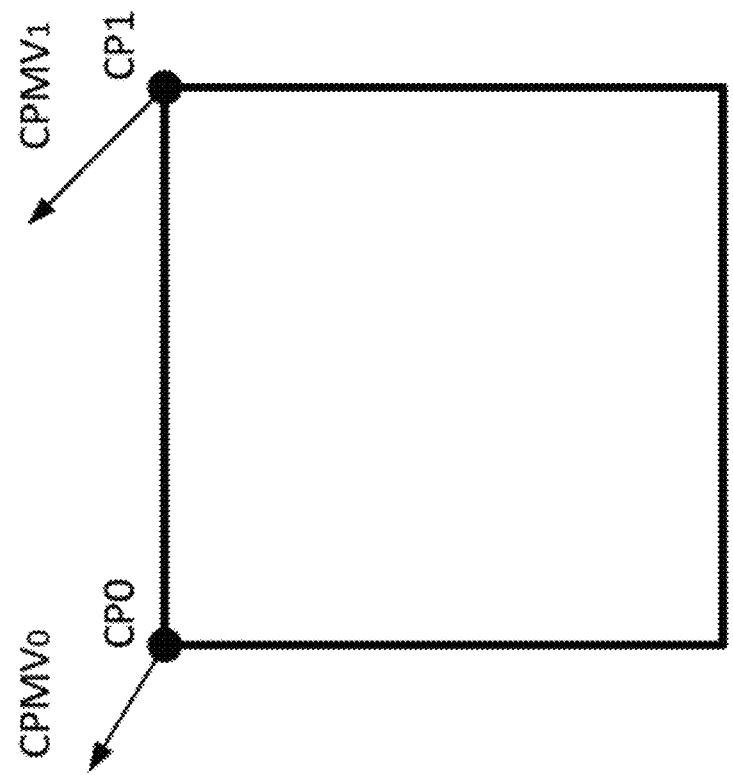
FIG. 15A shows an affine motion field of a block when a 4-parameter affine model is used.

In some examples, a translation motion model is applied for motion compensation prediction (MCP). However, the translational motion model may not be suitable for modeling other types of motions, such as zoom in/out, rotation, perspective motions, and the other irregular motions. In some embodiments, a block-based affine transform motion compensation prediction is applied. In FIG. 15A, an affine motion field of a block is described by two control point motion vectors (CPMVs), CPMV0 and CPMV1, of two control points (CPs), CP0 and CP1 when a 4-parameter affine model is used. In FIG. 15B, an affine motion field of a block is described by three CPMVs, CPMV0, CPMV1 and CPMV3, of CPs, CP0, CP1, and CP2 when a 6-parameter affine model is used.

For a 4-parameter affine motion model, a motion vector at a sample location (x, y) in a block is derived as:

$$\begin{cases} mv_x = \dfrac{mv_{1x} - mv_{0x}}{W}x + \dfrac{mv_{1y} - mv_{0y}}{W}y + mv_{0x} \\ mv_y = \dfrac{mv_{1y} - mv_{0y}}{W}x + \dfrac{mv_{1y} - mv_{0x}}{W}y + mv_{0y} \end{cases} \quad \text{Eq. 1}$$

For a 6-parameter affine motion model, a motion vector at sample location (x, y) in a block is derived as:

$$\begin{cases} mv_x = \dfrac{mv_{1x} - mv_{0x}}{W}x + \dfrac{mv_{2x} - mv_{0x}}{H}y + mv_{0x} \\ mv_y = \dfrac{mv_{1y} - mv_{0y}}{W}x + \dfrac{mv_{2y} - mv_{0y}}{H}y + mv_{0y} \end{cases} \quad \text{Eq. 2}$$

In Eqs. 1-2, ($mv_{0x}$, $mv_{0y}$) is a motion vector of the top-left corner control point, ($mv_{1x}$, $mv_{1y}$) is motion vector of the top-right corner control point, and ($mv_{2x}$, $mv_{2y}$) is motion vector of the bottom-left corner control point. In addition, the coordinate (x, y) is with respect to the top-left corner of the respective block, and W and H denotes the width and height of the respective block.

Figure 16:
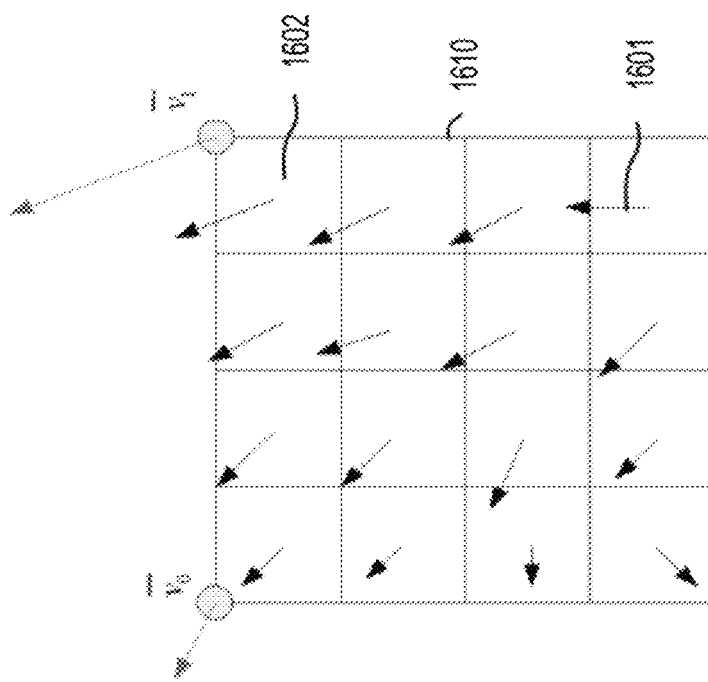
FIG. 16 shows an example of a sub-block based affine transform prediction.

In order to simplify the motion compensation prediction, a sub-block based affine transform prediction is applied in some embodiments. For example, in FIG. 16, the 4-parameter affine motion model is used, and two CPMVs, $\vec{v}_0$ and $\vec{v}_1$, are determined. To derive a motion vector of each 4×4 (samples) luma sub-block (1602) partitioned from the current block (1610), a motion vector (1601) of the center sample of each sub-block (1602) is calculated according to Eq. 1, and rounded to a 1/16 fraction accuracy. Then, motion compensation interpolation filters are applied to generate a prediction of each sub-block (1602) with the derived motion vector (1601). The sub-block size of chroma-components is set to be 4×4. A MV of a 4×4 chroma sub-block is calculated as the average of the MVs of the four corresponding 4×4 luma sub-blocks.

Similar to translational motion inter prediction, two affine motion inter prediction modes, affine merge mode and affine AMVP mode, are employed in some embodiments.

In some embodiments, an affine merge mode can be applied for CUs with both width and height larger than or equal to 8. Affine merge candidates of a current CU can be generated based on motion information of spatial neighboring CUs. There can be up to five affine merge candidates and an index is signaled to indicate the one to be used for the current CU. For example, the following three types of affine merge candidates are used to form an affine merge candidate list:

(i) Inherited affine merge candidates that are extrapolated from CPMVs of the neighbor CUs;
(ii) Constructed affine merge candidates that are derived using the translational MVs of the neighbor CUs; and
(iii) Zero MVs.

In some embodiments, there can be at most two inherited affine candidates which are derived from affine motion models of the neighboring blocks, one from left neighboring CUs and one from above neighboring CUs. The candidate blocks, for example, can be located at positions shown in FIG. 9. For the left predictor, the scan order is A0>A1, and for the above predictor, the scan order is B0>B1>B2. Only the first inherited candidate from each side is selected. No pruning check is performed between two inherited candidates.

Figure 17:
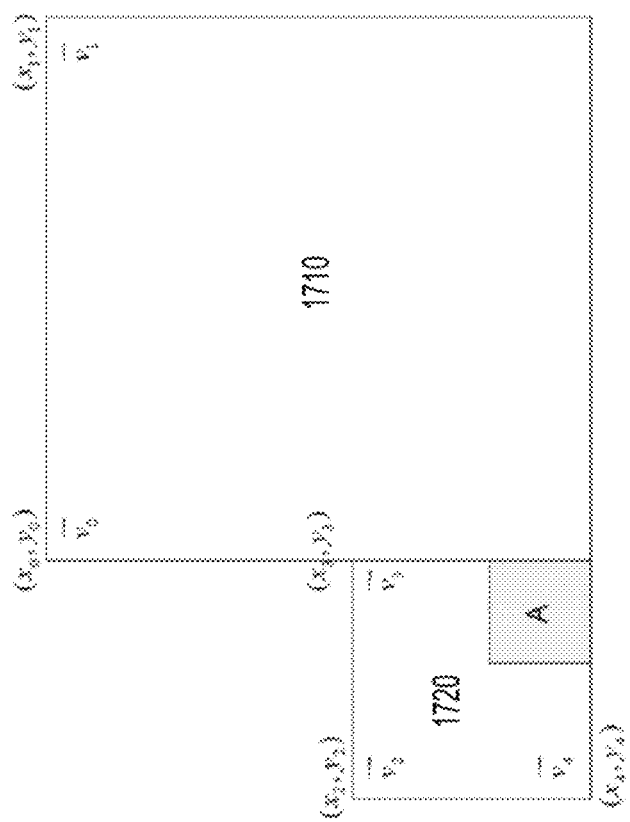
FIG. 17 shows an example of determining a control point motion vector (CPMV) candidate in an affine merge list of a current CU.

When a neighboring affine CU is identified, CPMVs of the identified neighboring affine CU are used to derive a CPMV candidate in the affine merge list of the current CU. As shown in FIG. 17, a neighbor left bottom block A of a current CU (1710) is coded in an affine mode. Motion vectors, $\vec{v}_2$, $\vec{v}_3$ and $\vec{v}_4$ of the top left corner, above right corner and left bottom corner of a CU (1720) which contains the block A are attained. When block A is coded with a 4-parameter affine model, two CPMVs $\vec{v}_0$ and $\vec{v}_1$ of the current CU (1710) are calculated according $\vec{v}_2$, and $\vec{v}_3$. In case that block A is coded with 6-parameter affine model, three CPMVs (not shown) of the current CU are calculated according to $\vec{v}_2$, $\vec{v}_3$ and $\vec{v}_4$.

Constructed affine candidates are constructed by combining neighbor translational motion information of each control point. The motion information for the control points is derived from specified spatial neighbors and temporal neighbor shown in FIG. 18. CPMVk (k=1, 2, 3, 4) represents the k-th control point. For CPMV1, the B2>B3>A2 blocks are checked in order and the MV of the first available block is used. For CPMV2, the B1>B0 blocks are checked and for CPMV3, the A1>A0 blocks are checked. A TMVP at block T is used as CPMV4 if available.

After MVs of four control points are attained, affine merge candidates are constructed based on that motion information. The following combinations of control point MVs are used to construct in order: {CPMV1, CPMV2, CPMV3}, {CPMV1, CPMV2, CPMV4}, {CPMV1, CPMV3, CPMV4}, {CPMV2, CPMV3, CPMV4}, {CPMV1, CPMV2}, {CPMV1, CPMV3}.

The combination of 3 CPMVs constructs a 6-parameter affine merge candidate and the combination of 2 CPMVs constructs a 4-parameter affine merge candidate. To avoid a motion scaling process, if the reference indices of control points are different, the related combination of control point MVs is discarded.

After inherited affine merge candidates and constructed affine merge candidates are checked, if the list is still not full, zero MVs are inserted to the end of the merge candidate list.

In some embodiments, affine AMVP mode can be applied for CUs with both width and height larger than or equal to 16. An affine flag in CU level is signaled in the bitstream to indicate whether affine AMVP mode is used and then another flag is signaled to indicate whether 4-parameter affine or 6-parameter affine is used. A difference of the CPMVs of current CU and their predictors is signaled in the bitstream. An affine AVMP candidate list size is 2, and can be generated by using the following four types of CPVM candidate in order:

(i) Inherited affine AMVP candidates that are extrapolated from the CPMVs of the neighbor CUs;
(ii) Constructed affine AMVP candidates that are derived using the translational MVs of the neighbor CUs;
(iii) Translational MVs from neighboring CUs; and
(iv) Zero MVs.

The checking order of inherited affine AMVP candidates is similar to the checking order of inherited affine merge candidates in an example. The difference is that, for AVMP candidate, the affine CU that has the same reference picture as in current block is considered. No pruning process is applied when inserting an inherited affine motion predictor into the candidate list.

Figure 18:
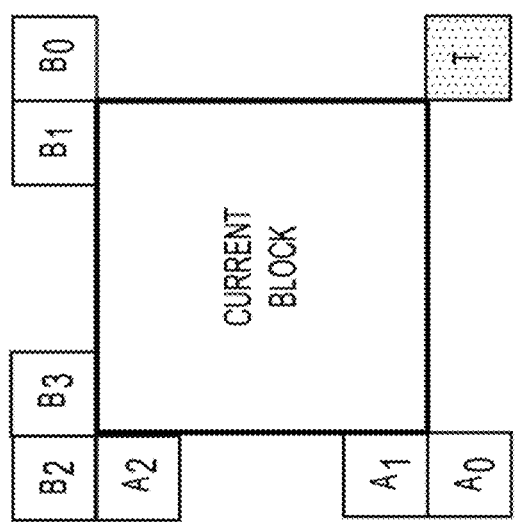
FIG. 18 shows examples of spatial neighbors and a temporal neighbor of a current block.

Constructed AMVP candidate is derived from the specified spatial neighbors shown in FIG. 18. A same checking order is used as done in affine merge candidate construction. In addition, a reference picture index of a neighboring block is also checked. The first block in the checking order that is inter coded and has the same reference picture as in current CUs is used. When the current CU is coded with a 4-parameter affine model, and CPMV0 and CPMV1 are both available, the available CPMVs are added as one candidate in the affine AMVP list. When the current CU is coded with 6-parameter affine mode, and all three CPMVs (CPMV0, CPMV1, and CPMV2) are available, the available CPMVs are added as one candidate in the affine AMVP list. Otherwise, constructed AMVP candidates are set as unavailable.

If affine AMVP list candidates are still less than 2 after inherited affine AMVP candidates and constructed AMVP candidate are checked, translational motion vectors neighboring the control points will be added to predict all control point MVs of the current CU, when available. Finally, zero MVs are used to fill the affine AMVP list if the affine AMVP list is still not full.

In related technologies, such as in VVC and ECM, an MV can point to a reference block outside a picture boundary or a frame boundary in an inter prediction mode (e.g., a uni-prediction mode or a bi-prediction mode). For example, one or more reference samples of the reference block pointed to by the MV are located outside the picture boundary of a reference picture. In some embodiments, an inter predictor (e.g., a reference block in the uni-prediction mode or a bi-predictor based on a first reference block and a second reference block for the bi-prediction mode) may not predict a current block accurately or efficiently when at least one MV exceeds the frame boundary.

Figure 19:
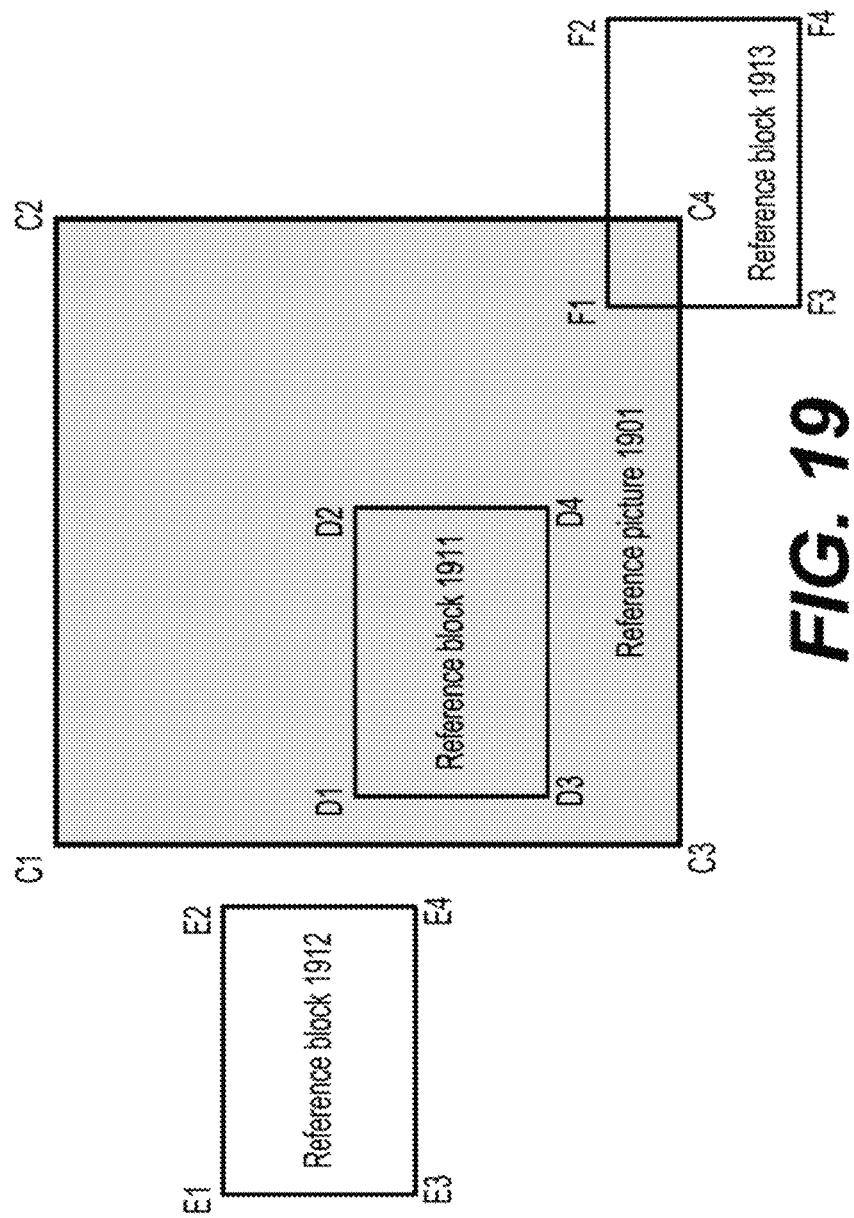
FIG. 19 shows an example of a reference picture of a current block and reference blocks of the current block.

FIG. 19 shows an example of a reference picture (1901) (shaded in gray) of a current block (not shown) and reference blocks (1911)-(1914) of the current block. A picture boundary or a frame boundary of the reference picture (1901) can be determined by four corners C1-C4 of the reference picture (1901). The four corners C1-C4 are a top-left corner C1, a top-right corner C2, a bottom-left corner C3, and a bottom-right corner C4.

In FIG. 19, the reference block (1911) is within the shaded area. The reference block (1911) is within the reference picture (1901) or within the picture boundary of the reference picture (1901) when each reference sample in the reference block (1911) is within the reference picture (1901). The reference block (1911) has a rectangular shape, and four corners D1-D4 of the reference block (1911) is within the reference picture (1901).

A reference block is outside the reference picture (1901) or outside the picture boundary of the reference picture (1901) when at least one reference sample in the reference block is outside the reference picture (1901). For example, the reference block (1911) is outside the shaded area. The reference block (1912) is outside the reference picture (1901) or outside the picture boundary of the reference picture (1901). Four corners E1-E4 of the reference block (1912) are outside the reference picture (1901).

The reference block (1913) is partially outside the shaded area. A corner F1 of the reference block (1913) is inside the reference picture (1901), and corners F2-F4 are outside the reference picture (1901). The reference block (1913) is outside the reference picture (1901) or outside the picture boundary of the reference picture (1901).

A current block in a current picture can be coded in the inter prediction mode. The current block can be coded based on one or more reference blocks of the current block that are associated with respective one or more reference pictures (e.g., (i) a first reference picture or (ii) the first reference picture and a second reference picture). According to an embodiment of the disclosure, motion information of the current block can be constrained. A motion information constraint of the current block can indicate that the one or more reference blocks are within the respective one or more reference pictures, that is, the one or more reference blocks are within picture boundaries of the respective one or more reference pictures. The motion information constraint can be pre-determined and agreed between an encoder and a decoder. The motion information constraint can be sent (e.g., signaled) to a decoder.

In an example, the current block is coded based on a first reference block associated with the first reference picture in the uni-prediction mode. The motion information constraint of the current block can indicate that the first reference block is within the first reference picture. In an embodiment, the first reference block is within the first reference picture when each first reference sample in the first reference block is within the first reference picture (e.g., within a picture boundary of the first reference picture).

In an example, the current block is coded based on the first reference block associated with the first reference picture and a second reference block associated with the second reference picture in the bi-prediction mode. The motion information constraint of the current block can indicate that the first reference block is within the first reference picture and the second reference block is within the second reference picture.

In an embodiment, the current block is coded with a non-merge mode, such as the AMVP mode. An MV (e.g., a final MV) of the current block can be determined (e.g., derived) from an MVP and an MVD at a given AMVR resolution. For example, the MV is a sum of the MVP and the MVD. The MVP can be determined based on an index (e.g., an MVP index) and an MVP candidate list of the current block. The motion information constraint (e.g., an MV constraint) for the non-merge mode can indicate that the MV (e.g., the final MV) cannot point out of a picture boundary of a reference picture, for example, a reference block pointed to by the MV cannot be outside the picture boundary of the reference picture. In an example, each reference sample in the reference block is within the reference picture.

In an embodiment, the current block is bi-predicted (e.g., encoded or reconstructed in the bi-prediction mode) with the non-merge mode (e.g., the AMVP mode). The MV, the MVP, the MVD, the reference picture, and the reference block described above are referred to as the first MV, the first MVP, the first MVD, the first reference picture, and the first reference block, respectively. A second MV of the current block can be determined from a second MVP and a second MVD at a second AMVR resolution. In an example, the first MVP and the second MVP are determined based on an MVP candidate in the MVP candidate list. The motion information constraint can be applied for the bi-prediction in the non-merge mode. The motion information constraint for the non-merge mode can further indicate that the second MV cannot point out of a picture boundary of a second reference picture, for example, a second reference block pointed to by the second MV cannot be outside the picture boundary of the second reference picture. In an example, each second reference sample in the second reference block is within the second reference picture.

The motion information constraint described above in the non-merge mode can apply to the current block that is uni-predicted or bi-predicted using a merge mode where, for example, the first MV and/or the second MV are determined from respective MVP(s) without an MVD.

In an embodiment, the current block is coded with an affine mode (e.g., the affine AMVP mode or affine merge mode) and includes plural subblocks. In an example, each subblock in the plural subblocks has respective MV information (e.g., a first MV in the uni-prediction mode or an MV pair in the bi-prediction mode), such as described in FIG. 16.

In an example, the current block is coded in the uni-prediction mode. The MV information of each subblock indicates a first MV of the subblock that points from the subblock to a first reference subblock in a first reference block associated with a first reference picture. The motion information constraint can indicate that the first MV of each subblock in the current block coded in the affine mode cannot point out of a picture boundary of the first reference picture. For example, the motion information constraint indicates that each first reference subblock in the first reference block is within the first reference picture.

The above description can be adapted when the current block is coded in the bi-prediction mode. For example, in addition to the first MV of the subblock, the MV information of each subblock further indicates a second MV that points from the subblock to a second reference subblock in a second reference block associated with a second reference picture. The motion information constraint can indicate that the first MV of each subblock in the current block coded in the affine mode cannot point out of the picture boundary of the first reference picture and the second MV of each subblock in the current block cannot point out of a picture boundary of the second reference picture. For example, the motion information constraint further indicates that each second reference subblock in the second reference block is within the second reference picture.

The motion information constraint in the affine mode described above can be applied when a subblock in the current block further includes one or more regions where each region has a respective MV or an MV pair, for example, the respective MV or the respective MV pair of each region is constrained such that the respective MV or the respective MV pair of each region cannot point out of a respective picture boundary of a respective reference picture.

In an embodiment, if an MV points out of a picture boundary (e.g., a frame boundary), a clip operation or a clipping operation is used to ensure a reference block or a portion of the reference block that is pointed to by the MV is inside (e.g., completely inside) the picture boundary of a reference picture.

In an example, the current block is bi-predicted using the first MV and the second MV. The first MV can point from the current block to the first reference block associated with the first reference picture and the second MV can point from the current block to the second reference block associated with the second reference picture. If the first MV points out of the picture boundary of the first reference picture (e.g., a portion of the first reference block is outside the first reference picture), the clip operation can be used to determine a first clipped MV. The first clipped MV can point from the current block to an updated first reference block where the updated first reference block is within the first reference picture. The clipping operation can be applied to the second MV if a portion of the second reference block is outside the second reference picture, as described above.

The clipping operation described above for the bi-predicted current block can be adapted when the current block is uni-predicted using the first MV, and the first MV can be clipped as described above.

The clip operation described above can be applied if the current block is coded with the AMVP mode where the first MV (or the second MV) is determined based on an MVP and an MVD. The clip operation described above can be applied if the current block is coded with the merge mode where the first MV (or the second MV) is determined based on an MVP without an MVD. For example, the MVP is determined with an MVP index that points to an MVP candidate in a candidate list of the current block.

The clip operation described above can be applied if the current block is coded with the affine mode, such as the affine AMVP mode, the affine merge mode, or the like. For example, the current block is bi-predicted with the affine mode and includes plural subblocks. In an example, a subblock in the plural subblocks includes one or more regions where each region in the one or more regions has respective MV information, such as an MV pair of each region. Accordingly, the subblock can be coded with one or more MV pairs associated with the respective one or more regions. In an example, the one or more regions is one region, and the subblock is the one region, for example, an MV pair of the subblock is applicable to the entire subblock, such as described in FIG. 16.

For each region in the subblock in the plural subblocks, an MV pair can include (i) a respective first MV pointing from the region to a first reference region in a first reference subblock that is in a first reference block associated with a first reference picture and (ii) a respective second MV pointing from the region to a second reference region in a second reference subblock that is in a second reference block associated with a second reference picture. The first reference block and the second reference block correspond to the current block, and the first reference subblock and the second reference subblock correspond to the subblock. If the first reference region is outside the first reference picture, the clipping operation can be applied to the first MV. For example, a first clipped MV is determined by clipping the first MV such that the first clipped MV points from the region in the subblock to an updated first reference region that is within the first reference picture. The clipping operation can be applied to the second MV if the second reference region is outside the second reference picture.

The clipping operation described above for the bi-predicted current block with the affine mode can be adapted when the current block is uni-predicted with the affine mode. For example, each region in the subblock of the current block is predicted based on the first reference region in the first reference subblock that is in the first reference block. The first reference region is pointed to by the first MV. No second MV is used when the current block is uni-predicted. The clipping operation is applied when the first region is outside the first reference picture, such as described above.

An MVP candidate list of the current block can include one or more MVP candidates. The one or more MVP candidates can include MVP candidate(s) for the uni-prediction mode and/or MVP candidate(s) for the bi-prediction mode.

According to an embodiment of the disclosure, construction of the MVP candidate list can be constrained, for example, the MVP candidate list can be constrained. In an example, the construction of the MVP candidate list is constrained when the current block is coded with a merge mode. In an example, the construction of the MVP candidate list is constrained when the current block is coded with a non-merge mode, such as the AMVP mode. The construction of the MVP candidate list can be constrained for the bi-prediction mode or the uni-prediction mode.

In an example, the MVP candidate list is constrained such that one or more of the MVP candidate(s) for the bi-prediction mode are constrained. An MVP candidate for the bi-prediction mode can include a first MVP and a second MVP. The first MVP can point from the current block to a first intermediate reference block associated with a first reference picture. The second MVP can point from the current block to a second intermediate reference block associated with a second reference picture. The MVP candidate for the bi-prediction mode is constrained such that the first intermediate reference block is within the first reference picture and the second intermediate reference block is within the second reference picture. In an example, each of the MVP candidate(s) for the bi-prediction mode in the MVP candidate list is constrained.

In an example, the MVP candidate list is constrained such that one or more of the MVP candidate(s) for the uni-prediction mode are constrained. An MVP candidate for the uni-prediction mode can include one MVP, such as the first MVP without the second MVP. The MVP candidate for the uni-prediction mode is constrained such that the first intermediate reference block is within the first reference picture. In an example, each of the MVP candidate(s) for the uni-prediction mode in the MVP candidate list is constrained.

In an example, the MVP candidate list is constrained such that (i) one or more of the MVP candidate(s) for the bi-prediction mode are constrained, such as described above and (ii) one or more of the MVP candidate(s) for the uni-prediction mode are constrained, such as described above.

In an embodiment, the construction of the MVP candidate list may or may not be constrained. According to an embodiment of the disclosure, a usage of MVP candidate(s) in the MVP candidate list is constrained. The MVP candidate list can include the MVP candidate(s) for the bi-prediction mode and the MVP candidate(s) for the uni-prediction mode. An index (e.g., an MVP index) indicating an MVP candidate (e.g., (i) a first MVP in the uni-prediction mode or (ii) the first MVP and a second MVP in the bi-prediction mode) in the MVP candidate list points to the MVP candidate. In the merge mode, an MV (e.g., in the uni-prediction mode) or an MV pair (e.g., in the bi-prediction mode) is determined based on the MVP candidate. For example, the MV is the first MVP in the uni-prediction mode. In an example, such as in the bi-prediction mode, the MV pair includes a first MV that is the first MVP and a second MV that is the second MVP. If the MV, the first MV, or the second MV points out of a picture boundary (e.g., a frame boundary) of a respective reference picture, the index cannot be selected. In an example, the index is not selected and thus is not signaled. In an example, the MVP candidate corresponding to the index is constrained such that the MVP candidate cannot be used to code the current block.

A usage of affine candidate(s) in a candidate list (e.g., an affine candidate list) can be constrained when the current block is coded in the affine mode. As described above, the current block can include the plural subblocks. In an example, each subblock in the plural subblocks includes one or more regions where each region in the one or more regions has a respective MV or a respective MV pair. Motion information of each subblock can include (i) one or more MVs (in the uni-prediction mode) or (ii) one or more MV pairs (in the bi-prediction mode) that are associated with the respective one or more regions.

In an embodiment, the MV information of each subblock can be determined based on an affine candidate (e.g., an affine merge candidate) in the affine candidate list of the current block. According to an embodiment of the disclosure, the MV information of each subblock in the current block can be constrained, for example, the one or more MVs (in the uni-prediction mode) or (ii) the one or more MV pairs (in the bi-prediction mode) are constrained such that (i) the one or more MVs or (ii) the one or more MV pairs cannot point out of picture boundaries of respective reference pictures. Otherwise, if (i) one of the one or more MVs or (ii) an MV in the one or more MV pairs points out of a picture boundary of a respective reference picture, the affine candidate (e.g., an affine merge candidate) of the current block cannot be selected, for example, to code the current block.

In an embodiment, an affine candidate list (e.g., an affine merge candidate list) is constrained when the current block is coded in the affine mode. The affine candidate list can include affine candidate(s). The affine candidate list can be constrained such that each of the affine candidate(s) is constrained. In an example, an affine candidate is constrained such that MV information (e.g., (i) one or more MVs of one or more respective regions in the subblock or (ii) one or more MV pairs of the one or more respective regions in the subblock) of each subblock in the current block that is determined based on the affine candidate is within a respective picture boundary in a respective reference picture, as described above.

Embodiments described in the application can be combined in any suitable combination or any suitable order. For example, when the current block is coded with the non-merge mode (e.g., the AMVP mode), each MV associated with a respective reference picture is determined based on an MVP and an MVD. The motion information constraint of the current block can indicate that (i) each MV is constrained as described above (e.g., a reference block pointed to by the MV is within a respective reference picture) and (ii) the corresponding MVP is constrained (e.g., an intermediate reference block pointed to by the MVP is within the respective reference picture) as described above.

Figure 20:
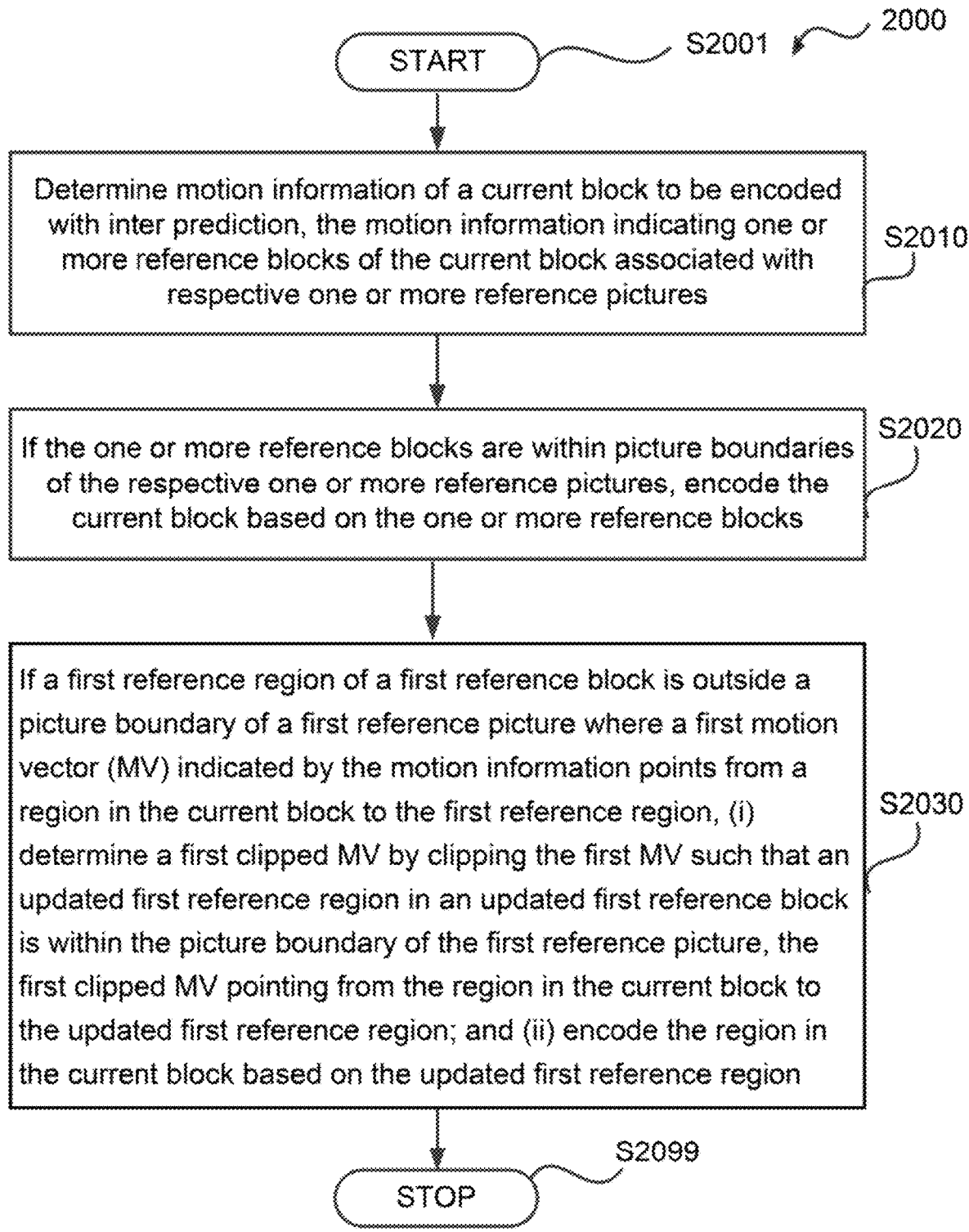
FIG. 20 shows a flow chart outlining an encoding process according to an embodiment of the disclosure.

FIG. 20 shows a flow chart outlining an encoding process (2000) according to an embodiment of the disclosure. In various embodiments, the process (2000) is executed by processing circuitry, such as the processing circuitry in the terminal devices (310), (320), (330) and (340), processing circuitry that performs functions of a video encoder (e.g., (403), (603), (703)), or the like. In some embodiments, the process (2000) is implemented in software instructions, thus when the processing circuitry executes the software instructions, the processing circuitry performs the process (2000). The process starts at (S2001), and proceeds to (S2010).

At (S2010), motion information of a current block to be encoded with inter prediction can be determined. The motion information can indicate one or more reference blocks of the current block associated with respective one or more reference pictures.

At (S2020), if the one or more reference blocks are within picture boundaries of the respective one or more reference pictures, the current block can be encoded based on the one or more reference blocks.

At (S2030), if a first reference region of a first reference block in the one or more reference blocks is outside a picture boundary of a first reference picture in the one or more reference pictures, a first clipped MV can be determined by clipping a first motion vector (MV) such that an updated first reference region in an updated first reference block is within the picture boundary of the first reference picture. The first MV indicated by the motion information can point from a region in the current block to the first reference region, and the first clipped MV can point from the region in the current block to the updated first reference region. The region in the current block can be encoded based on the updated first reference region.

The process (2000) then proceeds to (S2099), and terminates.

The process (2000) can be suitably adapted to various scenarios and steps in the process (2000) can be adjusted accordingly. One or more of the steps in the process (2000) can be adapted, omitted, repeated, and/or combined. Any suitable order can be used to implement the process (2000). Additional step(s) can be added.

In an example, at (S2020), if a reference block in the one or more reference blocks is outside a picture boundary of the respective reference picture in the one or more reference pictures, updated motion information can be determined for the current block such that an updated reference block indicated by the updated motion information is within the picture boundary of the respective reference picture in the one or more reference pictures. The updated motion information may be signaled for the current block and the current block can be encoded based on the updated reference block. In this example, the step (S2030) is omitted.

Figure 21:
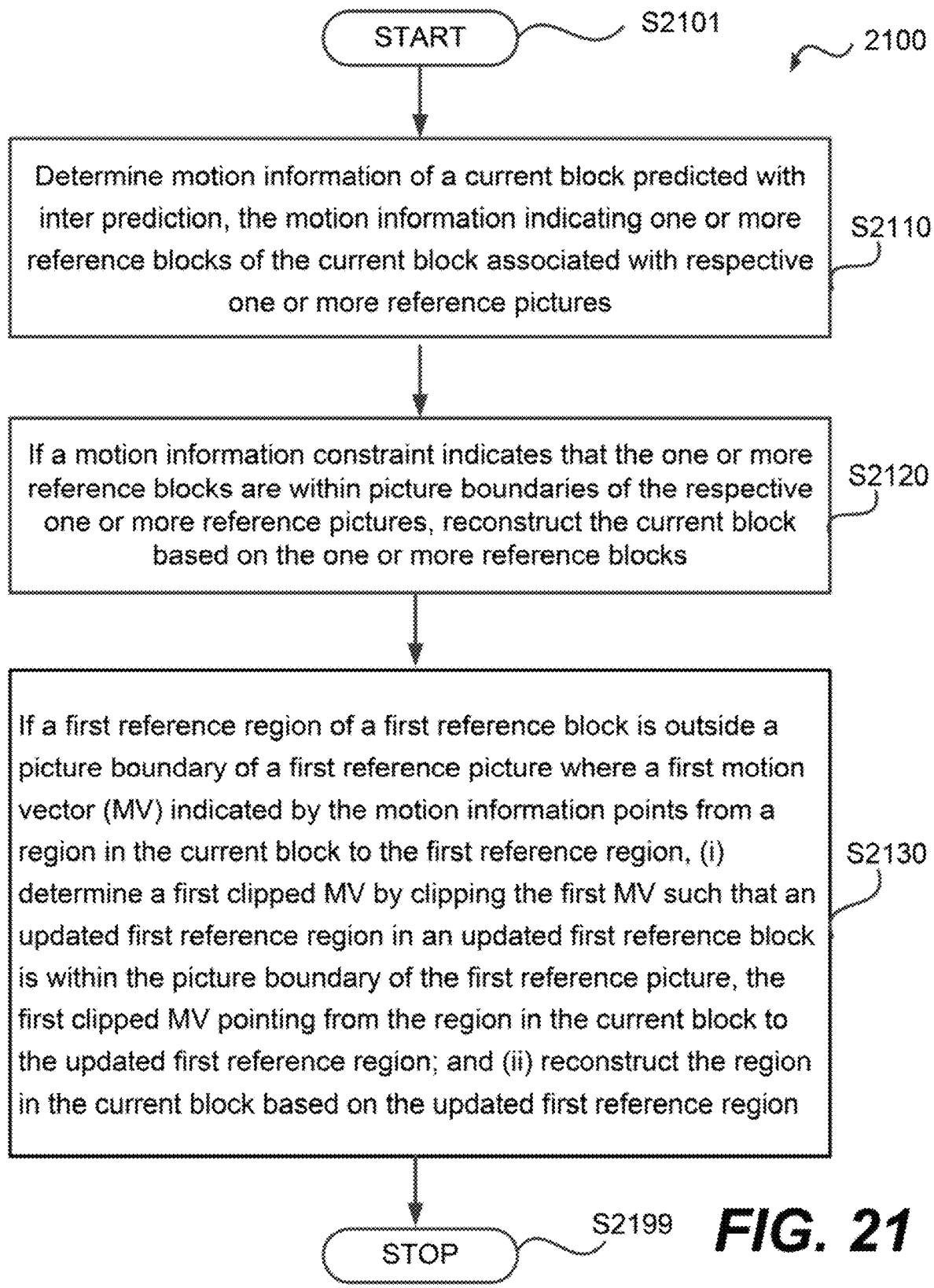
FIG. 21 shows a flow chart outlining a decoding process according to an embodiment of the disclosure.

FIG. 21 shows a flow chart outlining a decoding process (2100) according to an embodiment of the disclosure. In various embodiments, the process (2100) is executed by processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (2100) is implemented in software instructions, thus when the processing circuitry executes the software instructions, the processing circuitry performs the process (2100). The process starts at (S2101), and proceeds to (S2110).

At (S2110), motion information of a current block predicted with inter prediction can be determined. The motion information indicates one or more reference blocks of the current block associated with respective one or more reference pictures.

At (S2120), if a motion information constraint indicates that the one or more reference blocks are within picture boundaries of the respective one or more reference pictures, the current block can be reconstructed based on the one or more reference blocks.

In an embodiment, the current block is bi-predicted with an adaptive motion vector prediction (AMVP) mode. The motion information indicates the first MV pointing from the current block to the first reference block and a second MV pointing from the current block to a second reference block associated with a second reference picture. The one or more reference blocks consist of the first reference block and the second reference block. The motion information constraint indicates that the first reference block is within the picture boundary of the first reference picture and the second reference block is within a picture boundary of the second reference picture, the picture boundaries including the picture boundary of the second reference picture.

In an embodiment, the motion information indicates an MV predictor (MVP) candidate in a candidate list. The MVP candidate indicates a first MVP and a second MVP. The first MVP points to a first intermediate reference block that corresponds to the current block and that is within the picture boundary of the first reference picture. The second MVP points to a second intermediate reference block that corresponds to the current block and that is within the picture boundary of the second reference picture. The first MV is determined based on the first MVP and a first MV difference (MVD), and a second MV is determined based on the second MVP and a second MVD where the second MV points to the second reference block.

In an embodiment, the current block is bi-predicted with an affine mode and includes plural subblocks. The motion information indicates MV pairs each associated with one of the plural subblocks. Each MV pair associated with the respective subblock in the plural subblocks includes a first MV pointing from the respective subblock to a first reference subblock in the first reference block and a second MV pointing from the respective subblock to a second reference subblock in a second reference block associated with a second reference picture. The one or more reference blocks consist of first reference block and the second reference block. The motion information constraint indicates that each of the first reference subblocks is within the picture boundary of the first reference picture and each of the second reference subblocks is within a picture boundary of the second reference picture. The picture boundaries include the picture boundary of the second reference picture.

In an embodiment, the current block is bi-predicted with a merge mode. A candidate list of the current block includes one or more MV predictor (MVP) candidates. An MVP candidate of the current block can be determined from the one or more MVP candidates based on an MVP index. The MVP candidate indicates a first MVP associated with the first reference picture and a second MVP associated with a second reference picture. The first MV of the current block is determined to be the first MVP and a second MV of the current block is determined to be the second MVP. The motion information constraint indicates that (i) the first reference block pointed to by the first MV is within the picture boundary of the first reference picture, and a second reference block pointed to by the second MV is within a picture boundary of the second reference picture. The picture boundaries include the picture boundary of the second reference picture.

In an example, for each MVP candidate in the one or more MVP candidates that indicates a respective first MVP and a respective second MVP, the motion information constraint indicates that (i) a first intermediate reference block pointed to by the respective first MVP is within a picture boundary of a respective first reference picture, and (ii) a second intermediate reference block pointed to by the respective second MVP is within a picture boundary of a respective second reference picture.

In an embodiment, the current block is bi-predicted with an affine merge mode and includes plural subblocks. A candidate list of the current block includes one or more affine merge candidates. For each subblock in the plural subblocks, an MV pair of the respective region can be determined, for each region in the respective subblock, based on an affine merge candidate in the one or more affine merge candidates. The MV pair includes a respective first MV pointing from the region to a first region in a first reference subblock in the first reference block and a respective second MV pointing from the region to a second region in a second reference subblock that is in a second reference block associated with a second reference picture. The first reference block and the second reference block correspond to the current block, and the first reference subblock and the second reference subblock correspond to the respective subblock. The motion information constraint indicates that each first region is within the picture boundary of the first reference picture and each second region is within a picture boundary of the second reference picture. The picture boundaries including the picture boundary of the second reference picture.

At (S2130), a first motion vector (MV) indicated by the motion information points from a region in the current block to a first reference region, and the first reference region is a region of a first reference block in the one or more reference blocks. If the first reference region is outside a picture boundary of a first reference picture of the one or more reference pictures, a first clipped MV pointing from the region in the current block to an updated first reference region can be determined by clipping the first MV such that the updated first reference region is in an updated first reference block that is within the picture boundary of the first reference picture. The picture boundaries include the picture boundary of the first reference picture. The region in the current block can be reconstructed based on the updated first reference region.

In an embodiment, the current block is bi-predicted. The motion information indicates the first MV pointing from the current block to the first reference block and a second MV pointing from the current block to a second reference block associated with a second reference picture. The one or more reference blocks consist of the first reference block and the second reference block. The first reference region of the first reference block is outside the picture boundary of the first reference picture. The first clipped MV is determined by clipping the first MV such that the updated first reference block is within the picture boundary of the first reference picture. If the second reference block is outside a picture boundary of the second reference picture, a second clipped MV is determined by clipping the second MV such that an updated second reference block is within the picture boundary of the second reference picture. The second clipped MV points from the current block to the updated second reference block. The picture boundaries include the picture boundary of the second reference picture.

In an embodiment, the current block is bi-predicted with an affine mode and includes plural subblocks. For each subblock in the plural subblocks, an MV pair of the respective region is determined, for each region in the respective subblock, using the affine mode. The MV pair includes a respective first MV pointing from the region to a first reference region in a first reference subblock in the first reference block and a second MV pointing from the region to a second reference region in a second reference subblock that is in a second reference block associated with a second reference picture. The first reference block and the second reference block correspond to the current block, and the first reference subblock and the second reference subblock correspond to the respective subblock. The first reference region is in a first reference subblock in the first reference block, and the region in the current block is in a subblock of the plural subblocks corresponding to the first reference subblock. The first reference region is outside the picture boundary of the first reference picture. The first clipped MV is determined by clipping the first MV where the first clipped MV points from the region in the subblock to the updated first reference region.

The process (2100) proceeds to (S2199), and terminates.

The process (2100) can be suitably adapted to various scenarios and steps in the process (2100) can be adjusted accordingly. One or more of the steps in the process (2100) can be adapted, omitted, repeated, and/or combined. Any suitable order can be used to implement the process (2100). Additional step(s) can be added.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above can be implemented as computer software using computer-readable instructions and physically stored in one or more computer-readable media. For example, FIG. 22 shows a computer system (2200) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 22:
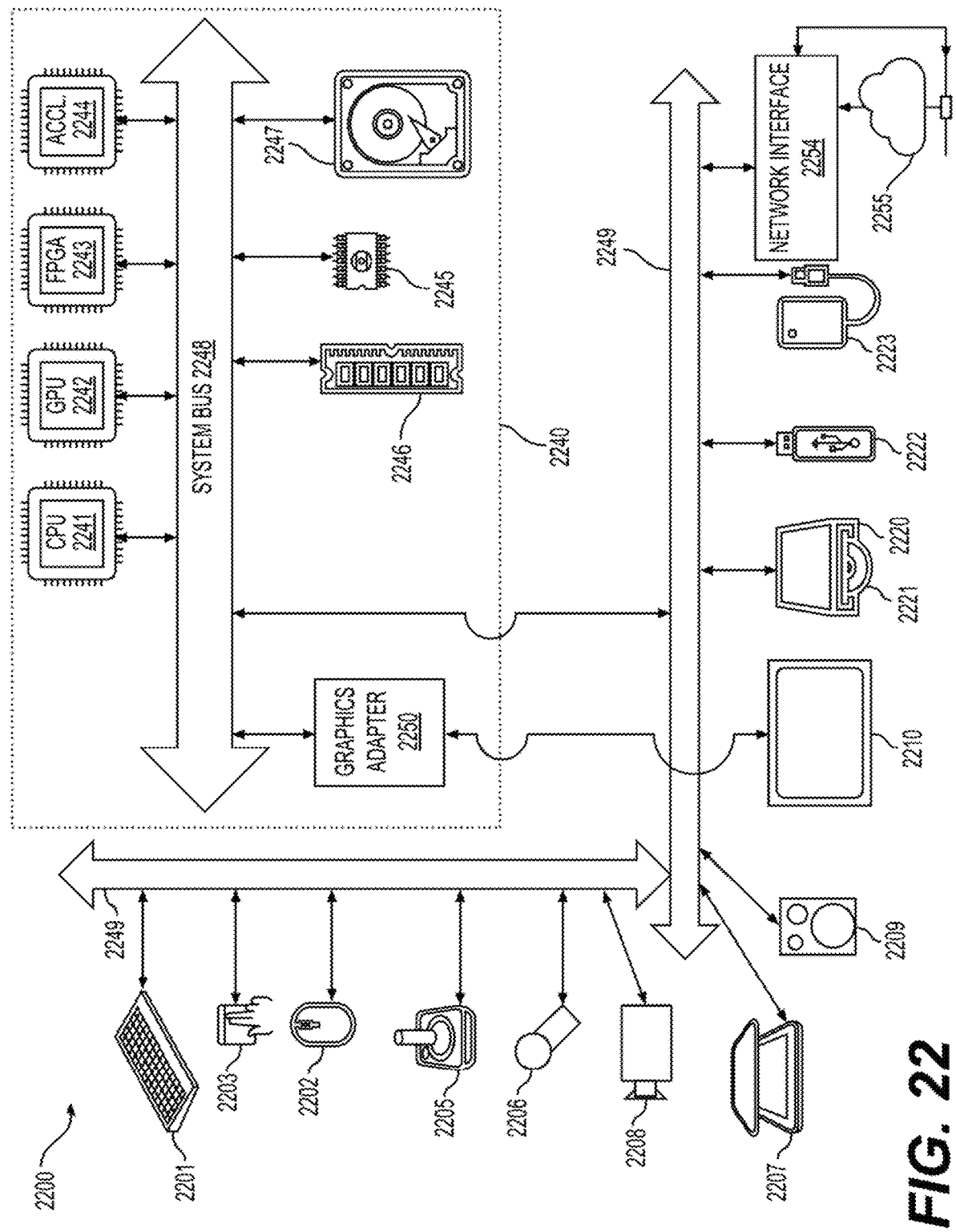
FIG. 22 is a schematic illustration of a computer system in accordance with an embodiment.

The components shown in FIG. 22 for computer system (2200) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2200).

Computer system (2200) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2201), mouse (2202), trackpad (2203), touch-screen (2210), data-glove (not shown), joystick (2205), microphone (2206), scanner (2207), camera (2208).

Computer system (2200) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2210), data-glove (not shown), or joystick (2205), but there can also be tactile feedback devices that do not serve as input devices), audio output devices (such as: speakers (2209), headphones (not depicted)), visual output devices (such as screens (2210) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (2200) can also include human accessible storage devices and their associated media such as optical media including CD/DVD ROM/RW (2220) with CD/DVD or the like media (2221), thumb-drive (2222), removable hard drive or solid state drive (2223), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2200) can also include an interface (2254) to one or more communication networks (2255). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2249) (such as, for example USB ports of the computer system (2200)); others are commonly integrated into the core of the computer system (2200) by attachment to a system bus as described below (for example Ethernet interface into a PC computer system or cellular network interface into a smartphone computer system). Using any of these networks, computer system (2200) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2240) of the computer system (2200).

The core (2240) can include one or more Central Processing Units (CPU) (2241), Graphics Processing Units (GPU) (2242), specialized programmable processing units in the form of Field Programmable Gate Areas (FPGA) (2243), hardware accelerators for certain tasks (2244), graphics adapters (2250), and so forth. These devices, along with Read-only memory (ROM) (2245), Random-access memory (2246), internal mass storage such as internal non-user accessible hard drives, SSDs, and the like (2247), may be connected through a system bus (2248). In some computer systems, the system bus (2248) can be accessible in the form of one or more physical plugs to enable extensions by additional CPUs, GPU, and the like. The peripheral devices can be attached either directly to the core's system bus (2248), or through a peripheral bus (2249). In an example, the screen (2210) can be connected to the graphics adapter (2250). Architectures for a peripheral bus include PCI, USB, and the like.

CPUs (2241), GPUs (2242), FPGAs (2243), and accelerators (2244) can execute certain instructions that, in combination, can make up the aforementioned computer code. That computer code can be stored in ROM (2245) or RAM (2246). Transitional data can be stored in RAM (2246), whereas permanent data can be stored for example, in the internal mass storage (2247). Fast storage and retrieve to any of the memory devices can be enabled through the use of cache memory, that can be closely associated with one or more CPU (2241), GPU (2242), mass storage (2247), ROM (2245), RAM (2246), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (2200), and specifically the core (2240) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2240) that are of non-transitory nature, such as core-internal mass storage (2247) or ROM (2245). The software implementing various embodiments of the present disclosure can be stored in such devices and executed by core (2240). A computer-readable medium can include one or more memory devices or chips, according to particular needs. The software can cause the core (2240) and specifically the processors therein (including CPU, GPU, FPGA, and the like) to execute particular processes or particular parts of particular processes described herein, including defining data structures stored in RAM (2246) and modifying such data structures according to the processes defined by the software. In addition or as an alternative, the computer system can provide functionality as a result of logic hardwired or otherwise embodied in a circuit (for example: accelerator (2244)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
R-D: Rate-Distortion While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a video decoder, the method comprising:
    determining motion information of a current block predicted with inter prediction, the motion information indicating one or more reference blocks of the current block associated with respective one or more reference pictures;
    when a motion information constraint indicates that the one or more reference blocks are within picture boundaries of the respective one or more reference pictures, reconstructing the current block based on the one or more reference blocks, wherein the one or more reference blocks have a same size as the current block; and
    when a first motion vector (MV) indicated by the motion information points from a region in the current block to a first reference region, the first reference region being a region of a first reference block in the one or more reference blocks and being outside a picture boundary of a first reference picture of the one or more reference pictures, the picture boundaries including the picture boundary of the first reference picture,
        determining a first clipped MV pointing from the region in the current block to an updated first reference region by clipping the first MV such that the updated first reference region is in an updated first reference block that is within the picture boundary of the first reference picture; and
        reconstructing the region in the current block based on the updated first reference region.

2. The method of claim 1, wherein
    the current block is bi-predicted with an adaptive motion vector prediction (AMVP) mode;
    the motion information indicates the first MV pointing from the current block to the first reference block and a second MV pointing from the current block to a second reference block associated with a second reference picture;
    the one or more reference blocks consist of the first reference block and the second reference block; and
    the motion information constraint indicates that the first reference block is within the picture boundary of the first reference picture and the second reference block is within a picture boundary of the second reference picture, the picture boundaries including the picture boundary of the second reference picture.

3. The method of claim 2, wherein
    the motion information indicates an MV predictor (MVP) candidate in a candidate list, the MVP candidate indicating a first MVP and a second MVP;
    the first MVP points to a first intermediate reference block that corresponds to the current block and that is within the picture boundary of the first reference picture;

the second MVP points to a second intermediate reference block that corresponds to the current block and that is within the picture boundary of the second reference picture; and the determining the motion information includes:
determining the first MV based on the first MVP and a first MV difference (MVD); and
determining a second MV based on the second MVP and a second MVD, the second MV pointing to the second reference block.

4. The method of claim 1, wherein
the current block is bi-predicted with an affine mode and includes plural subblocks;
the motion information indicates MV pairs each associated with one of the plural subblocks;
each MV pair associated with the respective subblock in the plural subblocks includes a first MV pointing from the respective subblock to a first reference subblock in the first reference block and a second MV pointing from the respective subblock to a second reference subblock in a second reference block associated with a second reference picture;
the one or more reference blocks consist of the first reference block and the second reference block; and
the motion information constraint indicates that each of the first reference subblocks is within the picture boundary of the first reference picture and each of the second reference subblocks is within a picture boundary of the second reference picture, the picture boundaries including the picture boundary of the second reference picture.

5. The method of claim 1, wherein
the current block is bi-predicted with a merge mode;
a candidate list of the current block includes one or more MV predictor (MVP) candidates;
the determining the motion information includes:
determining an MVP candidate of the current block from the one or more MVP candidates based on an MVP index, the MVP candidate indicating a first MVP associated with the first reference picture and a second MVP associated with a second reference picture; and
determining the first MV of the current block to be the first MVP and a second MV of the current block to be the second MVP; and
the motion information constraint indicates that:
the first reference block pointed to by the first MV is within the picture boundary of the first reference picture; and
a second reference block pointed to by the second MV is within a picture boundary of the second reference picture, the picture boundaries including the picture boundary of the second reference picture.

6. The method of claim 5, wherein
for each MVP candidate in the one or more MVP candidates that indicates a respective first MVP and a respective second MVP, the motion information constraint indicates that:
a first intermediate reference block pointed to by the respective first MVP is within a picture boundary of a respective first reference picture; and
a second intermediate reference block pointed to by the respective second MVP is within a picture boundary of a respective second reference picture.

7. The method of claim 1, wherein
the current block is bi-predicted with an affine merge mode and includes plural subblocks;

a candidate list of the current block includes one or more affine merge candidates; and
for each subblock in the plural subblocks,
the determining the motion information includes determining, for each region in the respective subblock, an MV pair of the respective region based on an affine merge candidate in the one or more affine merge candidates, the MV pair including a respective first MV pointing from the region to a first region in a first reference subblock in the first reference block and a respective second MV pointing from the region to a second region in a second reference subblock that is in a second reference block associated with a second reference picture, the first reference block and the second reference block corresponding to the current block, the first reference subblock and the second reference subblock corresponding to the respective subblock; and
the motion information constraint indicates that each first region is within the picture boundary of the first reference picture and each second region is within a picture boundary of the second reference picture, the picture boundaries including the picture boundary of the second reference picture.

8. The method of claim 1, wherein
the current block is bi-predicted;
the motion information indicates the first MV pointing from the current block to the first reference block and a second MV pointing from the current block to a second reference block associated with a second reference picture;
the one or more reference blocks consist of the first reference block and the second reference block;
the first reference region of the first reference block is outside the picture boundary of the first reference picture;
the determining the first clipped MV includes determining the first clipped MV by clipping the first MV such that the updated first reference block is within the picture boundary of the first reference picture; and
when the second reference block is outside a picture boundary of the second reference picture, determining a second clipped MV by clipping the second MV such that an updated second reference block is within the picture boundary of the second reference picture, the second clipped MV pointing from the current block to the updated second reference block, the picture boundaries including the picture boundary of the second reference picture.

9. The method of claim 1, wherein
the current block is bi-predicted with an affine mode and includes plural subblocks;
for each subblock in the plural subblocks, the determining the motion information includes determining, for each region in the respective subblock, an MV pair of the respective region using the affine mode, the MV pair including a respective first MV pointing from the region to the first reference region in a first reference subblock in the first reference block and a second MV pointing from the region to a second reference region in a second reference subblock that is in a second reference block associated with a second reference picture, the first reference block and the second reference block corresponding to the current block, the first reference subblock and the second reference subblock corresponding to the respective subblock;

the first reference region is in the first reference subblock in the first reference block, the region in the current block being in a subblock of the plural subblocks corresponding to the first reference subblock;

the first reference region is outside the picture boundary of the first reference picture; and the determining the first clipped MV includes determining the first clipped MV by clipping the first MV, the first clipped MV pointing from the region in the subblock to the updated first reference region.

10. A method for video encoding in a video encoder, the method comprising:

determining motion information of a current block based on inter prediction, the motion information indicating one or more reference blocks of the current block associated with respective one or more reference pictures;

when a motion information constraint indicates that the one or more reference blocks are within picture boundaries of the respective one or more reference pictures, encoding the current block based on the one or more reference blocks, wherein the one or more reference blocks have a same size as the current block; and when a first motion vector (MV) indicated by the motion information points from a region in the current block to a first reference region, the first reference region being a region of a first reference block in the one or more reference blocks and being outside a picture boundary of a first reference picture of the one or more reference pictures, the picture boundaries including the picture boundary of the first reference picture, determining a first clipped MV pointing from the region in the current block to an updated first reference region by clipping the first MV such that the updated first reference region is in an updated first reference block that is within the picture boundary of the first reference picture; and encoding the region in the current block based on the updated first reference region.

11. The method of claim 10, wherein the current block is bi-predicted with an adaptive motion vector prediction (AMVP) mode;

the motion information indicates the first MV pointing from the current block to the first reference block and a second MV pointing from the current block to a second reference block associated with a second reference picture;

the one or more reference blocks consist of the first reference block and the second reference block; and the motion information constraint indicates that the first reference block is within the picture boundary of the first reference picture and the second reference block is within a picture boundary of the second reference picture, the picture boundaries including the picture boundary of the second reference picture.

12. The method of claim 11, wherein the motion information indicates an MV predictor (MVP) candidate in a candidate list, the MVP candidate indicating a first MVP and a second MVP;

the first MVP points to a first intermediate reference block that corresponds to the current block and that is within the picture boundary of the first reference picture;

the second MVP points to a second intermediate reference block that corresponds to the current block and that is within the picture boundary of the second reference picture; and the determining the motion information includes:
  determining the first MV based on the first MVP and a first MV difference (MVD); and
  determining a second MV based on the second MVP and a second MVD, the second MV pointing to the second reference block.

13. The method of claim 10, wherein the current block is bi-predicted with an affine mode and includes plural subblocks;

the motion information indicates MV pairs each associated with one of the plural subblocks;

each MV pair associated with the respective subblock in the plural subblocks includes a first MV pointing from the respective subblock to a first reference subblock in the first reference block and a second MV pointing from the respective subblock to a second reference subblock in a second reference block associated with a second reference picture;

the one or more reference blocks consist of the first reference block and the second reference block; and the motion information constraint indicates that each of the first reference subblocks is within the picture boundary of the first reference picture and each of the second reference subblocks is within a picture boundary of the second reference picture, the picture boundaries including the picture boundary of the second reference picture.

14. The method of claim 10, wherein the current block is bi-predicted with a merge mode;

a candidate list of the current block includes one or more MV predictor (MVP) candidates;

the determining the motion information includes:
  determining an MVP candidate of the current block from the one or more MVP candidates based on an MVP index, the MVP candidate indicating a first MVP associated with the first reference picture and a second MVP associated with a second reference picture; and
  determining the first MV of the current block to be the first MVP and a second MV of the current block to be the second MVP; and the motion information constraint indicates that:
  the first reference block pointed to by the first MV is within the picture boundary of the first reference picture; and
  a second reference block pointed to by the second MV is within a picture boundary of the second reference picture, the picture boundaries including the picture boundary of the second reference picture.

15. The method of claim 14, wherein for each MVP candidate in the one or more MVP candidates that indicates a respective first MVP and a respective second MVP, the motion information constraint indicates that:
  a first intermediate reference block pointed to by the respective first MVP is within a picture boundary of a respective first reference picture; and
  a second intermediate reference block pointed to by the respective second MVP is within a picture boundary of a respective second reference picture.

16. The method of claim 10, wherein the current block is bi-predicted with an affine merge mode and includes plural subblocks;

a candidate list of the current block includes one or more affine merge candidates; and for each subblock in the plural subblocks,
  the determining the motion information includes determining, for each region in the respective subblock, an MV pair of the respective region based on an affine merge candidate in the one or more affine merge candidates, the MV pair including a respective first MV pointing from the region to a first region in a first reference subblock in the first reference block and a respective second MV pointing from the region to a second region in a second reference subblock that is in a second reference block associated with a second reference picture, the first reference block and the second reference block corresponding to the current block, the first reference subblock and the second reference subblock corresponding to the respective subblock; and the motion information constraint indicates that each first region is within the picture boundary of the first reference picture and each second region is within a picture boundary of the second reference picture, the picture boundaries including the picture boundary of the second reference picture.

17. The method of claim 10, wherein the current block is bi-predicted;

the motion information indicates the first MV pointing from the current block to the first reference block and a second MV pointing from the current block to a second reference block associated with a second reference picture;

the one or more reference blocks consist of the first reference block and the second reference block;

the first reference region of the first reference block is outside the picture boundary of the first reference picture;

the determining the first clipped MV includes determining the first clipped MV by clipping the first MV such that the updated first reference block is within the picture boundary of the first reference picture; and when the second reference block is outside a picture boundary of the second reference picture, determining a second clipped MV by clipping the second MV such that an updated second reference block is within the picture boundary of the second reference picture, the second clipped MV pointing from the current block to the updated second reference block, the picture boundaries including the picture boundary of the second reference picture.

18. The method of claim 10, wherein the current block is bi-predicted with an affine mode and includes plural subblocks;

for each subblock in the plural subblocks, the determining the motion information includes determining, for each region in the respective subblock, an MV pair of the respective region using the affine mode, the MV pair including a respective first MV pointing from the region to the first reference region in a first reference subblock in the first reference block and a second MV pointing from the region to a second reference region in a second reference subblock that is in a second reference block associated with a second reference picture, the first reference block and the second reference block corresponding to the current block, the first reference subblock and the second reference subblock corresponding to the respective subblock;

the first reference region is in the first reference subblock in the first reference block, the region in the current block being in a subblock of the plural subblocks corresponding to the first reference subblock;

the first reference region is outside the picture boundary of the first reference picture; and the determining the first clipped MV includes determining the first clipped MV by clipping the first MV, the first clipped MV pointing from the region in the subblock to the updated first reference region.

19. A method of processing visual media data, the method comprising:

processing a bitstream that includes the visual media data according to a format rule, wherein the bitstream includes coded information of a current block; and the format rule specifies that:

motion information of the current block predicted with inter prediction is determined, the motion information indicating one or more reference blocks of the current block associated with respective one or more reference pictures;

when a motion information constraint indicates that the one or more reference blocks are within picture boundaries of the respective one or more reference pictures, the current block is processed based on the one or more reference blocks, wherein the one or more reference blocks have a same size as the current block; and when a first motion vector (MV) indicated by the motion information points from a region in the current block to a first reference region, the first reference region being a region of a first reference block in the one or more reference blocks and being outside a picture boundary of a first reference picture of the one or more reference pictures, the picture boundaries including the picture boundary of the first reference picture, a first clipped MV pointing from the region in the current block to an updated first reference region is determined by clipping the first MV such that the updated first reference region is in an updated first reference block that is within the picture boundary of the first reference picture; and the region in the current block is processed based on the updated first reference region.

20. The method of claim 19, wherein the current block is bi-predicted with an adaptive motion vector prediction (AMVP) mode;

the motion information indicates the first MV pointing from the current block to the first reference block and a second MV pointing from the current block to a second reference block associated with a second reference picture;

the one or more reference blocks consist of the first reference block and the second reference block; and the motion information constraint indicates that the first reference block is within the picture boundary of the first reference picture and the second reference block is within a picture boundary of the second reference picture, the picture boundaries including the picture boundary of the second reference picture.

\* \* \* \* \*